(12) United States Patent
Olson et al.

(10) Patent No.: US 9,757,689 B2
(45) Date of Patent: Sep. 12, 2017

(54) SORBENTS FOR THE OXIDATION AND REMOVAL OF MERCURY

(71) Applicant: Energy & Environmental Research Center Foundation, Grand Forks, ND (US)

(72) Inventors: Edwin S. Olson, Grand Forks, ND (US); Michael J. Holmes, Thompson, ND (US); John Henry Pavlish, East Grand Forks, MN (US)

(73) Assignee: Midwest Energy Emissions Corp., Lewis Center, OH (US)

( * ) Notice: Subject to any disclaimer, the term of this patent is extended or adjusted under 35 U.S.C. 154(b) by 62 days.

(21) Appl. No.: 14/318,270

(22) Filed: Jun. 27, 2014

(65) Prior Publication Data

US 2014/0308188 A1    Oct. 16, 2014

Related U.S. Application Data

(60) Continuation of application No. 13/966,768, filed on Aug. 14, 2013, now Pat. No. 8,821,819, which is a
(Continued)

(51) Int. Cl.
*B01D 47/00* (2006.01)
*B01D 53/46* (2006.01)
(Continued)

(52) U.S. Cl.
CPC ............. *B01D 53/64* (2013.01); *B01D 53/10* (2013.01); *B01J 20/20* (2013.01); *B01J 20/22* (2013.01);
(Continued)

(58) Field of Classification Search
CPC .............. B01D 53/64; B01D 2257/602; B01D 2253/104; B01D 2253/10; B01D 53/10
See application file for complete search history.

(56) References Cited

U.S. PATENT DOCUMENTS

| 1,984,164 A | 12/1934 | Alfred |
| 2,317,857 A | 4/1943 | Soday |

(Continued)

FOREIGN PATENT DOCUMENTS

| CA | 1099490 A1 | 4/1981 |
| CA | 2150529 A1 | 12/1995 |

(Continued)

OTHER PUBLICATIONS http://www.cabotcorp.com/solutions/products-plus/activated-carbon/powdered, Jan. 3, 2015, Cabot Powdered Activated Carbon.*
(Continued)

*Primary Examiner* — Amber R Orlando
(74) *Attorney, Agent, or Firm* — Schwegman Lundberg & Woessner, P.A.

(57) ABSTRACT

A promoted activated carbon sorbent is described that is highly effective for the removal of mercury from flue gas streams. The sorbent comprises a new modified carbon form containing reactive forms of halogen and halides. Optional components may be added to increase reactivity and mercury capacity. These may be added directly with the sorbent, or to the flue gas to enhance sorbent performance and/or mercury capture. Mercury removal efficiencies obtained exceed conventional methods. The sorbent can be regenerated and reused. Sorbent treatment and preparation methods are also described. New methods for in-flight preparation, introduction, and control of the active sorbent into the mercury contaminated gas stream are described.

33 Claims, 10 Drawing Sheets

Related U.S. Application Data continuation of application No. 13/427,665, filed on Mar. 22, 2012, now Pat. No. 8,512,655, which is a continuation of application No. 12/419,219, filed on Apr. 6, 2009, now Pat. No. 8,168,147, which is a continuation of application No. 12/201,595, filed on Aug. 29, 2008, now abandoned, which is a division of application No. 11/209,163, filed on Aug. 22, 2005, now Pat. No. 7,435,286.

(60) Provisional application No. 60/605,640, filed on Aug. 30, 2004.

(51) Int. Cl.
| | | |
|---|---|---|
| *B01D 53/56* | (2006.01) | |
| *B01D 53/86* | (2006.01) | |
| *B01J 8/00* | (2006.01) | |
| *B01D 53/64* | (2006.01) | |
| *B01D 53/10* | (2006.01) | |
| *B01J 20/20* | (2006.01) | |
| *B01J 20/22* | (2006.01) | |

(52) U.S. Cl.
CPC .. *B01D 2253/102* (2013.01); *B01D 2257/602* (2013.01); *Y10S 95/901* (2013.01)

(56) References Cited

U.S. PATENT DOCUMENTS

| | | | |
|---|---|---|---|
| 3,194,629 A | 7/1965 | Dreibelbis et al. | |
| 3,662,523 A | 5/1972 | Revoir et al. | |
| 3,786,619 A | 1/1974 | Melkersson | |
| 3,826,618 A | 7/1974 | Capuano | |
| 3,849,267 A | 11/1974 | Hilgen et al. | |
| 3,876,393 A | 4/1975 | Kasai et al. | |
| 4,094,777 A | 6/1978 | Sugier et al. | |
| 4,101,631 A | 7/1978 | Ambrosini et al. | |
| 4,196,173 A | 4/1980 | Dejong et al. | |
| 4,338,896 A | 7/1982 | Papasideris | |
| 4,500,327 A | 2/1985 | Nishino et al. | |
| 4,708,853 A | 11/1987 | Matviya et al. | |
| 4,786,483 A | 11/1988 | Audeh | |
| 4,814,152 A | 3/1989 | Yan | |
| 4,820,318 A | 4/1989 | Chang et al. | |
| 4,889,698 A | 12/1989 | Moller et al. | |
| 4,956,162 A | 9/1990 | Smith et al. | |
| 5,300,137 A | 4/1994 | Weyand et al. | |
| 5,336,835 A | 8/1994 | McNamara | |
| 5,409,522 A | 4/1995 | Durham et al. | |
| 5,462,908 A | 10/1995 | Liang et al. | |
| 5,505,766 A | 4/1996 | Chang | |
| 5,575,982 A | 11/1996 | Reiss et al. | |
| 5,607,496 A | 3/1997 | Brooks | |
| 5,672,323 A | 9/1997 | Bhat et al. | |
| 5,695,726 A | 12/1997 | Lerner | |
| 5,827,352 A | 10/1998 | Altman et al. | |
| 5,891,324 A | 4/1999 | Ohtsuka | |
| 6,027,551 A | 2/2000 | Hwang et al. | |
| 6,080,281 A | 6/2000 | Attia | |
| 6,136,072 A | 10/2000 | Sjostrom et al. | |
| 6,136,749 A * | 10/2000 | Gadkaree | B01D 53/8665 502/180 |
| 6,214,304 B1 | 4/2001 | Rosenthal et al. | |
| 6,258,334 B1 | 7/2001 | Gadkaree et al. | |
| 6,372,187 B1 | 4/2002 | Madden et al. | |
| 6,375,909 B1 | 4/2002 | Dangtran et al. | |
| 6,383,981 B1 | 5/2002 | Blankenship et al. | |
| 6,471,936 B1 | 10/2002 | Chen et al. | |
| 6,528,030 B2 | 3/2003 | Madden et al. | |
| 6,638,485 B1 | 10/2003 | Iida et al. | |
| 6,808,692 B2 | 10/2004 | Oehr | |
| 6,818,043 B1 | 11/2004 | Chang et al. | |
| 6,848,374 B2 * | 2/2005 | Srinivasachar | B01D 53/10 110/165 R |
| 6,878,358 B2 | 4/2005 | Vosteen et al. | |
| 6,942,840 B1 | 9/2005 | Broderick | |
| 6,953,494 B2 | 10/2005 | Nelson, Jr. | |
| 6,960,329 B2 | 11/2005 | Sellakumar | |
| 7,081,434 B2 | 7/2006 | Sinha | |
| 7,211,707 B2 | 5/2007 | Axtell et al. | |
| 7,435,286 B2 * | 10/2008 | Olson | B01D 53/10 110/345 |
| 7,479,263 B2 | 1/2009 | Chang et al. | |
| 7,514,052 B2 | 4/2009 | Lissianski et al. | |
| 7,521,032 B2 | 4/2009 | Honjo et al. | |
| 7,544,338 B2 | 6/2009 | Honjo et al. | |
| 7,563,311 B2 | 7/2009 | Graham | |
| 7,611,564 B2 | 11/2009 | Mcchesney et al. | |
| 7,622,092 B2 | 11/2009 | Honjo et al. | |
| 7,722,843 B1 | 5/2010 | Srinivasachar | |
| 7,767,174 B2 | 8/2010 | Lui et al. | |
| 7,780,765 B2 | 8/2010 | Srinivasachar et al. | |
| 8,007,749 B2 | 8/2011 | Chang et al. | |
| 8,168,147 B2 * | 5/2012 | Olson | B01D 53/10 423/103 |
| 8,168,149 B2 | 5/2012 | Gal et al. | |
| 8,216,535 B2 | 7/2012 | Pollack et al. | |
| 8,512,655 B2 | 8/2013 | Olson et al. | |
| 8,652,235 B2 | 2/2014 | Olson et al. | |
| 8,821,819 B2 | 9/2014 | Olson et al. | |
| 2001/0002387 A1 | 5/2001 | Tsutsumi et al. | |
| 2001/0003116 A1 | 6/2001 | Neufert | |
| 2002/0043496 A1 | 4/2002 | Boddu et al. | |
| 2002/0134242 A1 | 9/2002 | Yang et al. | |
| 2002/0150516 A1 | 10/2002 | Pahlman et al. | |
| 2003/0104937 A1 | 6/2003 | Sinha | |
| 2003/0136509 A1 | 7/2003 | Virtanen | |
| 2004/0003716 A1 * | 1/2004 | Nelson, Jr. | B01D 53/02 95/134 |
| 2004/0013589 A1 | 1/2004 | Vosteen et al. | |
| 2004/0076570 A1 | 4/2004 | Jia | |
| 2005/0019240 A1 | 1/2005 | Lu et al. | |
| 2006/0048646 A1 | 3/2006 | Olson et al. | |
| 2006/0191835 A1 | 8/2006 | Petrik et al. | |
| 2008/0090951 A1 | 4/2008 | Mao et al. | |
| 2008/0182747 A1 | 7/2008 | Sinha | |
| 2008/0292512 A1 | 11/2008 | Kang | |
| 2009/0062119 A1 | 3/2009 | Olson et al. | |
| 2009/0136401 A1 | 5/2009 | Yang et al. | |
| 2009/0235848 A1 | 9/2009 | Eiteneer et al. | |
| 2009/0320678 A1 | 12/2009 | Chang et al. | |
| 2010/0047146 A1 | 2/2010 | Olson et al. | |
| 2011/0076210 A1 | 3/2011 | Pollack et al. | |
| 2011/0168018 A1 | 7/2011 | Mohamadalizadeh et al. | |
| 2012/0183458 A1 | 7/2012 | Olson et al. | |
| 2013/0280156 A1 | 10/2013 | Olson et al. | |
| 2014/0056787 A1 | 2/2014 | Olson et al. | |
| 2014/0224121 A1 | 8/2014 | Mimna et al. | |
| 2014/0255279 A1 | 9/2014 | Olson et al. | |
| 2015/0246315 A1 | 9/2015 | Olson et al. | |

FOREIGN PATENT DOCUMENTS

| | | |
|---|---|---|
| CA | 2400898 A1 | 8/2001 |
| DE | 3426059 A1 | 1/1986 |
| DE | 10233173 A1 | 2/2004 |
| DE | 202012003747 U1 | 11/2012 |
| EP | 0208490 A1 | 1/1987 |
| EP | 1570894 A1 | 9/2005 |
| FR | 2529802 | 1/1984 |
| JP | 49-053590 A | 5/1974 |
| JP | 49-53593 A | 5/1974 |
| JP | 4953593 | 5/1974 |
| JP | 49-066592 A | 6/1974 |
| JP | 49043197 B4 | 11/1974 |
| JP | 50006438 B4 | 3/1975 |
| JP | 51-003386 A | 1/1976 |
| JP | 54004868 B | 1/1979 |
| SU | 732207 A1 | 5/1980 |
| SU | 1163982 A | 6/1985 |
| WO | WO-0162368 A1 | 8/2001 |

(56) References Cited

FOREIGN PATENT DOCUMENTS

WO    WO-2004/089501 A2    10/2004
WO    WO-2013/162968 A2    10/2013

OTHER PUBLICATIONS

"U.S. Appl. No. 14/195,360, Final Office Action mailed Mar. 18, 2016", 18 pgs.
"U.S. Appl. No. 14/195,360, Non Final Office Action mailed Jun. 20, 2016", 11 pgs.
"U.S. Appl. No. 14/195,360, Response filed May 17, 2016 to Final Office Action mailed Mar. 18, 2016", 15 pgs.
Arenillas, A, et al., "CO2 removal potential of carbons prepared by co-pyrolysis of sugar and nitrogen containing compounds", Journal of analytical and applied pyrolysis 74.1, (2005), 298-306.
Diamantopoulou, LR G Skodras, et al., "Sorption of mercury by activated carbon in the presence of flue gas components", Fuel Processing Technology 91.2, (2010), 158-163.
Kawabuchi, Yuji, et al., "Chemical vapor deposition of heterocyclic compounds over active carbon fiber to control its porosity and surface function", Langmuir 13.8, (1997), 2314-2317.
Raymundo-Pinero, E, et al., "Structural characterization of N-containing activated carbon fibers prepared from a low softening point petroleum pitch and a melamine resin", Carbon 40.4, (2002), 597-608.
"U.S. Appl. No. 11/209,163, Advisory Action mailed Apr. 21, 2008", 3 pgs.
"U.S. Appl. No. 11/209,163, Final Office Action mailed Jan. 23, 2008", 21 pgs.
"U.S. Appl. No. 11/209,163, Non Final Office Action mailed Aug. 13, 2007", 15 pgs.
"U.S. Appl. No. 11/209,163, Notice of Allowance mailed Jul. 14, 2008", 7 pgs.
"U.S. Appl. No. 11/209,163, Preliminary Amendment filed Feb. 27, 2007", 9 pgs.
"U.S. Appl. No. 11/209,163, Response filed Mar. 24, 2008 to Final Office Action mailed Jan. 23, 2008", 29 pgs.
"U.S. Appl. No. 11/209,163, Response filed Jul. 9, 2007 to Restriction Requirement mailed Jun. 7, 2007", 2 pgs.
"U.S. Appl. No. 11/209,163, Response filed Nov. 13, 2007 to Non Final Office Action mailed Aug. 13, 2007", 19 pgs.
"U.S. Appl. No. 11/209,163, Restriction Requirement mailed Jun. 7, 2007", 6 pgs.
"U.S. Appl. No. 12/201,595, Final Office Action mailed Mar. 10, 2010", 13 pgs.
"U.S. Appl. No. 12/201,595, Non Final Office Action mailed Apr. 16, 2009", 22 pgs.
"U.S. Appl. No. 12/201,595, Response filed Oct. 16, 2009 to Non Final Office Action mailed Apr. 16, 2009", 18 pgs.
"U.S. Appl. No. 12/419,219, Final Office Action mailed Oct. 14, 2010", 17 pgs.
"U.S. Appl. No. 12/419,219, Non Final Office Action mailed Jan. 15, 2010", 13 pgs.
"U.S. Appl. No. 12/419,219, Non Final Office Action mailed Feb. 23, 2011", 17 pgs.
"U.S. Appl. No. 12/419,219, Non Final Office Action mailed Aug. 4, 2011", 16 pgs.
"U.S. Appl. No. 12/419,219, Notice of Allowance Mailed Jan. 10, 2012", 7 pgs.
"U.S. Appl. No. 12/419,219, Preliminary Amendment filed Apr. 6, 2009", 7 pgs.
"U.S. Appl. No. 12/419,219, Response filed Feb. 14, 2011 to Final Office Action mailed Oct. 14, 2010", 19 pgs.
"U.S. Appl. No. 12/419,219, Response filed May 20, 2011 to Non Final Office Action mailed Feb. 23, 2011", 14 pgs.
"U.S. Appl. No. 12/419,219, Response filed Jul. 15, 2010 to Non Final Office Action mailed Jan. 15, 2010", 22 pgs.
"U.S. Appl. No. 12/419,219, Response filed Oct. 27, 2011 to Non Final Office Action mailed Aug. 4, 2011", 12 pgs.

"U.S. Appl. No. 13/427,665, Non Final Office Action mailed Jan. 4, 2013", 24 pgs.
"U.S. Appl. No. 13/427,665, Non Final Office Action mailed Aug. 3, 2012", 13 pgs.
"U.S. Appl. No. 13/427,665, Notice of Allowance mailed Apr. 16, 2013", 8 pgs.
"U.S. Appl. No. 13/427,665, Response filed Mar. 21, 2013 to Non Final Office Action mailed Jan. 4, 2013", 20 pgs.
"U.S. Appl. No. 13/427,665, Response filed Oct. 10, 2012 to Non Final Office Action mailed Aug. 3, 2012", 15 pgs.
"U.S. Appl. No. 13/427,685, Preliminary Amendment filed Mar. 22, 2012", 3 pgs.
"U.S. Appl. No. 13/966,768, Non Final Office Action mailed Dec. 6, 2013", 8 pgs.
"U.S. Appl. No. 13/966,768, Notice of Allowance mailed Apr. 18, 2014", 7 pgs.
"U.S. Appl. No. 13/966,768, Response filed Mar. 6, 2014 to Non Final Office Action mailed Dec. 6, 2013", 12 pgs.
"Canadian Application Serial No. 2,584,327, Office Action mailed Mar. 3, 2009".
Chang, "Method for Oxidation of Mercury Vapor", U.S. Appl. No. 60/560,904, filed Apr. 9, 2004, (Apr. 9, 2004).
Dunham, G.E, et al., "Mercury Capture by an Activated Carbon in a Fixed-Bed Bench-Scale System", Environmental Progress, vol. 17, No. 3, 203-208.
Felsvang, K, et al., "Mercury Reduction and Control Options", The U.S. EPA-DOE-EPRI Combined Power Plant Air Pollutant Control Symposium; The Mega Symposium and The A&WMA Specialty Conference and Mercury Emissions: Fate, Effects and Control; Chicago, IL, (Aug. 2001), 1-19.
Ghorishi, Behrooz, et al., "Sorption of Mercury Species by Activated Carbons and Calcium-Based Sorbents: Effect of Temperature, Mercury Concentration and Acid Gases", Waste Manage, Res., (1993), 582-593.
Lancia, et al., "Adsorption of Mercuric Chloride Vapours from Incinerator Flue Gases on Calcium Hydroxide Particles", Combust. Sci. & Technol, (1993), 93,277.
Olson, et al., "The Reduction of Gas Phase Air Toxics from Combustion and Incineration Sources using the MET-Mitsui-BF Activated Coke Process", Fuel Processing Technology, 65-66, (2000), 393-405.
Vosteen, B, et al., "Chlor-und Bromgestutzte Hg-Sorption an Elektrofilter-Flugaschen eines kohlegefeuerten Schmelzkammerkessels und an Zementrohmehl", Matin-Luther-Universitat Halle-Wittenberg, (2003), 1-30.
"U.S. Appl. No. 13/453,274, Non Final Office Action mailed May 30, 2014", 6 pgs.
"U.S. Appl. No. 13/453,274, Response filed Sep. 2, 2014 to Non Final Office Action mailed May 30, 2014", 13 pgs.
"U.S. Appl. No. 13/966,768, Notice of Allowability mailed Aug. 1, 2014", 6 pgs.
"U.S. Appl. No. 13/966,768, Preliminary Amendment filed Aug. 14, 2013", 3 pgs.
"U.S. Appl. No. 13/966,768, Supplemental Preliminary Amendment filed Aug. 15, 2013", 6 pgs.
"Bromine and its Compounds", Jolles, Z. E., Editor, Academic Press, Inc., New York, NY, (1966), pp. 193 and 205.
"European Application Serial No. 05814011.2, Response filed Sep. 9, 2011 to European Search Report mailed Apr. 14, 2009 and Office Actioin mailed Nov. 5, 2009", 20 pgs.
"European Application Serial No. 05814011.2, Office Action mailed Jan. 25, 2008", 2 pgs.
"European Application Serial No. 05814011.2, Office Action mailed Nov. 5, 2009", 2 pgs.
"European Application Serial No. 05814011.2, Partial European Search Report mailed Apr. 14, 2009", 13 pgs.
"European Application Serial No. 05814011.2, Response filed Apr. 18, 2008 to Office Action mailed Jan. 25, 2008 and Third Party Observations submitted Dec. 4, 2007", 7 pgs.
"European Application Serial No. 05814011.2, Response filed May 11, 2010 to Office Action mailed Nov. 5, 2009", 11 pgs.
"European Application Serial No. 05814011.2, Third Party Observations submitted Mar. 19, 2012", 7 pgs.

(56) References Cited

OTHER PUBLICATIONS

"European Application Serial No. 05814011.2, Third Party Observations submitted Dec. 4, 2007", 5 pgs.
"International Application Serial No. PCT/US2013/036964, International Search Report mailed Nov. 29, 2013", 7 pgs.
"International Application Serial No. PCT/US2013/036964, Invitation to Pay Additional Fees and Partial Search Report mailed Aug. 2, 2013", 7 pgs.
"International Application Serial No. PCT/US2013/036964, Written Opinion mailed Nov. 29, 2013", 13 pgs.
"International Application Serial No. PCT/US2014/019916, Invitation to Pay Additional Fees and Partial Search Report mailed May 30, 2014", 6 pgs.
Bakandritsos, A., et al., "Aqueous and Gaseous Adsorption from Montmorillonite-Carbon Composites and from Derived Carbons", *Langmuir*, 21, (2005), 2349-2355.
Bakandritsos, A., et al., "High Surface Area Montmorillonite—Carbon Composites and Derived Carbons", *Chemistry of Materials*, vol. 16, No. 8, (Mar. 16, 2004), 1551-1559.
Criswell, Gordon, et al., "Progress Report on Mercury Control Retrofit at the Colstrip Power Station", Paper #91, Mega Symposium, Baltimore, MD, (Aug. 2011), 1-23.
Darder, M., et al., "Caramel-clay nanocomposites", *Journal of Materials Chemistry*, 15, (2005), 3913-3918.
Dong, J., et al., "Mercury Removal from Flue Gases by Novel Regenerable Magnetic Nanocomposite Sorbents", *Environ. Sci. Technol.*, 43, (2009), 3266-3271.
Eisazadeh, H., "Removal of Mercury from Water Using Polypyrrole and its Composites", Chinese *Journal of Polymer Science*, 25(4), (2007), 393-397.
Fernandez-Saavedra, R., et al., "Polymer-Clay Nanocomposites as Precursors of Nanostructured Carbon Materials for Electrochemical Devices: Templating Effect of Clays", *Journal of Nanoscience and Nanotechnology*, 8, (2008), 1741-1750.
Ghorbani, M., et al., "Application of polyaniline nanocomposite coated on rice husk ash for removal of Hg(II) from aqueous media", *Synthetic Metals*, (2001), 4 pgs.
Gomez-Aviles, A., et al., "Functionalized Carbon-Silicates from Caramel-Sepiolite Nanocomposites", *Angew. Chem. Int. Ed.*, 46, (2007), 923-925.
Gomez-Aviles, A., et al., "Multifunctional materials based on graphene-like/sepiolite nanocomposites", *Applied Clay Science*, 47, (2010), 203-211.
Ikeue, K., et al., "Noble-metal-containing nanoporous carbon synthesized within the interlayer space of montmorillonite and its catalytic property", *Applied Catalysis A: General*, 351, (2008), 68-74.
Kyotani, T., et al., "Formation of highly orientated graphite from polyacrylonitrile by using a two-dimensional space between montmorillonite lamellae", *Nature*, 331, (1988), 331-333.
Laumb, Jason D., et al., "X-ray photoelectron spectroscopy analysis of mercury sorbent surface chemistry", *Fuel Processing Technology*, 85, (2004), 577-585.
Li, Y., et al., "Removal of elemental mercury from simulated coal-combustion flue gas using a $SiO_2$—$TiO_2$ nanocomposite", *Fuel Processing Technology*, 89, (2008), 567-573.
Mochida, I., et al., "Preparation of nitrogen containing pitches from quinoline and isoquinoline by AID of $AlCl_3$", *Carbon*, 33(8), (1995), 1069-1077.
Nguyen-Thanh, D., et al., "High Porosity Carbonaceous Adsorbents Templated From Porous Clay Heterostructures", *Prepr. Pap.-Am. Chem. Soc., Div. Fuel Chem.*, 51(1), (2006), 7-8.
Nguyen-Thanh, D., et al., "Metal-loaded carbonaceous adsorbents templated from porous clay heterostructures", *Microporous and Mesoporous Materials*, 92, (2006), 47-55.
Olson, E. S., et al., "Catalytic effects of carbon sorbents for mercury capture", *Journal of Hazardous Materials*, 74, (2000), 61-79.
Olson, Edwin S., et al., "Surface Compositions of Carbon Sorbents Exposed to Simulated Low-Rank Coal Flue Gases", *J. Air & Water Waste Manage. Assoc.*, 55, (2005), 747-754.
Vosteen, B. W., et al., Flyer on Mercury Abatement given at the VDI-Wissensforum, Dusseldorf,Germany, (2003), 6 pgs.
Vosteen, B. W., "Bromine-enhanced Mercury Abatement from Combustion Flue Gases—Recent Industrial Applications and Laboratory Research", *VGB PowerTech*, vol. 86, Issue Mar. 2006, (2006), 70-75.
Vosteen, N., "Emissionsminderung von Quecksilber durch chlor- und bromgestutzte Hg-Oxidation in Rauchgas", (Sep. 2003), 1-23.
Wan, Q., et al., "Removal of gaseous elemental mercury over a $CeO_2$-$WO_3$/$TiO_2$ nanocomposite in simulated coal-fired flue gas", *Chemical Engineering Journal*, 170, (2011), 512-517.
Wang, B., et al., "Performance of a diatomite-based sorbent in removing mercury from aqueous and oil matrices", *J. Environ. Eng. Sci.*, 6, (2007), 469-476.
Zhang, Y., et al., "High efficient removal of mercury from aqueous solution by polyaniline/humic acid nanocomposite", *Journal of Hazardous Materials*, 175, (2010), 404-409.
Zhao, Yongxin, et al., "Effectsof SulfurDioxide and Nitric Oxide on Mercury Oxidation and Reducton under Homogeneous Conditions", *J. Air & Waste Manage. Assoc.*, 56, (2006), 628-635.
Zheng, Yuanjing, et al., "Review of technologies for mercury removal from flue gas from cement production processes", *Progress in Energy and Combustion Science*, vol. 38, No. 5, (Apr. 26, 2012), 599-629.
Machine english translation of DE202012003747U1.
"U.S. Appl. No. 14/195,360, Non Final Office Action mailed Nov. 24, 2015", 19 pgs.
"U.S. Appl. No. 14/195,360, Response filed Feb. 22, 2016 to Non Final Office Action mailed Nov. 24, 2015", 21 pgs.
Bimer, Jan, et al., "Modified active carbons from precursors enriched with nitrogen functions: sulfur removal capabilities", (1998), 519-525.
Nickels, Dale L, et al., "Processing and reuse of activated carbon used to adsorb mercury from power plant flue gases", Final report, (2004).
Rachel, Ribeirovieira Azzi Rios, et al., "Tailoring Activated Carbon by Surface Chemical Modification with O, S, and N Containing Molecules", Materials Research. 6 (2), (2003), 129-135.
"U.S. Appl. No. 14/195,360, Final Office Action mailed Nov. 22, 2016", 7 pgs.
"U.S. Appl. No. 14/195,360, Notice of Allowance mailed Feb. 7, 2017", 5 pgs.
"U.S. Appl. No. 14/195,360, Response filed Jan. 18, 2017 to Final Office Action mailed Nov. 22, 2016", 7 pgs.
"U.S. Appl. No. 14/195,360, Response filed Sep. 16, 2016 to Non Final Office Action mailed Jun. 30, 2016", 12 pgs.
"DARCO® FGD—Powdered Activated Carbon", Norit Americas Inc. Datasheet No. 1100, (May 2009), 1 pg.
Maroto-Valer, M. Mercedes, et al., "Development of Activated Carbons From Coal and Biomass Combustion and Gasification Chars", (2004), 2 pgs.
U.S. Appl. No. 12/201,595, filed Aug. 29, 2008, Sorbents for the Oxidation and Removal of Mercury.
U.S. Appl. No. 14/712,558, filed May 14, 2015, Sorbents for the Oxidation and Removal of Mercury.
U.S. Appl. No. 14/195,360, filed Mar. 3, 2014, Activated Carbon Sorbent Including Nitrogen and Methods of Using the Same.

\* cited by examiner

SORBENTS FOR THE OXIDATION AND REMOVAL OF MERCURY

CROSS-REFERENCE TO RELATED APPLICATIONS

This application is a continuation of U.S. patent application Ser. No. 13/966,768, filed on Aug. 14, 2013, which, is a continuation of U.S. patent application Ser. No. 13/427,665, filed on Mar. 22, 2012, which is a continuation of U.S. patent application Ser. No. 12/419,219 filed on Apr. 6, 2009, which is a continuation of U.S. patent application Ser. No. 12/201,595 filed on Aug. 29, 2008, which is a division of U.S. patent application Ser. No. 11/209,163, filed on Aug. 22, 2005 (now Pat. No. 7,435,286), which claims priority to the extent appropriate from provisional application 60/605,640, filed on Aug. 30, 2004. Application Ser. Nos. 13/966,768; 13/427,665; 12/419,219; 12/201,595; 11/209,163; and 60/605,640 are incorporated herein by reference.

STATEMENT REGARDING FEDERALLY SPONSORED RESEARCH OR DEVELOPMENT

This invention was made with United States Government support under Grant Numbers R 827649-01 and CR 830929-01 awarded by the United States Environmental Protection Agency and under Contract Number DE-FC26-98FT40320 awarded by the United States Department of Energy. The United States Government has certain rights in this invention.

BACKGROUND OF THE INVENTION

Technical Field of the Invention

The present invention relates to methods and materials for the removal of pollutants from flue gas or product gas from a gasification system. In particular, mercury is removed from gas streams generated during the burning or gasification of fossil fuels by highly reactive regenerable sorbents.

Background of the Invention

The combustion and gasification of fossil fuel such as coal generates flue gas that contains mercury and other trace elements that originate from the fuel. The release of the mercury (and other pollutants) to the environment must be controlled by use of sorbents, scrubbers, filters, precipitators, and other removal technologies. Mercury is initially present in the elemental form during combustion and gasification. In downstream process sections, such as in the ducts and stack of a combustion system, some of the elemental mercury is oxidized. The amount that is oxidized depends on the amount of acid gases present in the flue gas and other factors. Amounts of mercury vary with the fuel, but concentrations of mercury in the stream of flue gas from coal combustion are typically less than 5 parts per billion (ppb). Large coal combustion facilities such as electric utilities may emit a pound of mercury, or more, per day. Mercury removal applications include, without limitation, flue gas from coal (or other fossil fuel) combustion, waste incineration, product gas from gasification, as well as off gases from mineral processing, metal refining, retorting, cement manufacturing, chloralkali plants, dental facilities, and crematories.

Mercury Sorbent Technologies

Several types of mercury control methods for flue gas have been investigated, including injection of fine sorbent particles into a flue gas duct and passing the flue gas through a sorbent bed. Fine-particle injection sorbents include activated carbon, metal oxide sorbent, sodium sulfide particles, and basic silicate or oxide sorbents. When particle injection is employed, the mercury captured on the sorbent particles is removed from the gas stream in a bag house or electrostatic precipitator (ESP) and collected along with ash particulate. The sulfide and basic silicate and oxide particles are effective only for the oxidized mercury, and the metal oxide sorbents exhibit slower capture kinetics than the carbon particles. Additionally, injection of fine carbon particles into the flue gas stream has been only partially successful in removing mercury, especially elemental mercury, where effective removal of only about 60% is attained for some applications with a FF (fabric filter) to collect carbon and ash. Even lower removal rates have been observed when using an ESP to collect the carbon because the contact time of the carbon with the gas is very short.

A major problem with existing carbon injection systems is that the sorbent is initially unreactive, and only after extended exposure to the flue gas does the sorbent become effectively seasoned and provide increased reactivity with the mercury in the gas. Consequently, these sorbents must be used in large amounts, at high sorbent-to-mercury ratios, to effectively capture the mercury. These sorbents tend to be relatively expensive and cannot be easily separated from the ash for regeneration and reuse. The collection of carbon in the ash also creates solid waste disposal problems, and the spent sorbent may contaminate the collected ash, preventing its use in various applications.

Accordingly, there remains a need for more economical and effective mercury removal technology. This invention provides for cost-effective removal of pollutants including mercury, using sorbent enhancement additives and/or highly reactive sorbents, with contact times of seconds (or less), and that may be regenerated and reused.

SUMMARY

It is thus an object of the present invention to overcome the deficiencies of the prior art and thereby to provide new and economical methods for the removal of mercury from the gases produced in the utilization of fossil fuels.

A halogen/halide promoted activated carbon sorbent is described that is highly effective for the removal of mercury from flue gas streams. The sorbent comprises a new halide-modified carbon form containing a reactive compound produced by the reaction of bromine (or halide or other halogen) with the carbon. Optional secondary components and alkali may be added to further increase reactivity and mercury capacity. Mercury removal efficiencies obtained exceed or match conventional methods with added benefits such as reduced costs. Optionally, the sorbent can be regenerated and reused. Sorbent treatment and/or preparation methods are also described. New methods for in-flight preparation, introduction, and control of the active sorbent into the mercury contaminated gas stream are described.

In some embodiments, a promoted carbon sorbent is provided comprising a base activated carbon that has reacted with a promoter selected from the group consisting of halides, halogens, and combinations thereof, such that the reaction product is effective for the removal of mercury from a gas stream.

In an embodiment, a promoted carbon sorbent is provided wherein the base activated carbon is selected from the group consisting of powdered activated carbon, granular activated carbon, carbon black, carbon fiber, aerogel carbon, pyrolysis char, activated carbon with an average particle size greater than that of flyash produced such that it is physically separable therefrom, and combinations thereof, and the promoter is selected from the group consisting of molecular halogens, Group V (CAS nomenclature is used throughout) halides, Group VI halides, hydrohalides, and combinations thereof. In an embodiment, the base activated carbon may have a mass mean particle diameter such that it can be substantially separated by physical means from entrained ash in the gas stream from which mercury is to be removed. In an embodiment, the base activated carbon may have a mass mean particle diameter greater than about 40 micrometers.

In another embodiment, the sorbent comprises from about 1 to about 30 grams promoter per 100 grams of base activated carbon. Another embodiment further comprises an optional secondary component comprising a halogen or a hydrohalide such that the reactivity and mercury capacity of the sorbent are enhanced.

In another embodiment, the concentration of the optional secondary component on the finished sorbent is within the range of from about 1 to about 15 wt-% of the concentration of the promoter on the finished sorbent.

In another embodiment, an optional alkali component may preferably be added to provide a synergistic effect through combination of this alkali with the primary sorbent.

In another embodiment, the optional secondary component is selected from the group consisting of Group V halides, Group VI halides, HI, HBr, HCl, and combinations thereof. In another embodiment, the promoter is substantially in vapor form when combined with the base activated carbon. In another embodiment, the promoter is combined with an organic solvent prior to reaction with the base activated carbon. In another embodiment, the promoter and optional secondary component are combined with the base activated carbon substantially simultaneously. Another embodiment further comprises adding a mercury-stabilizing reagent selected from the group consisting of S, Se, $H_2S$, $SO_2$, $H_2Se$, $SeO_2$, $CS_2$, $P_2S_5$, and combinations thereof. Another embodiment further comprises adding an optional alkali component.

In an embodiment, a method is provided comprising providing a granular activated carbon; reacting the activated carbon with a promoter selected from the group consisting of halogens, halides, and combinations thereof, such that the reaction product comprises a promoted carbon sorbent effective for removal of mercury from a gas stream. In a further embodiment, the reaction product comprises from about 1 to about 30 grams promoter per 100 grams activated carbon. In another embodiment the reaction product has an average particle size distribution greater than the average size of entrained ash particles in the gas stream from which mercury is to be removed, such that the reaction product can be substantially removed from the entrained ash particles by physical means. In another embodiment the reaction product has a mass mean particle diameter greater than about 40 micrometers.

In another embodiment, the promoter is selected from the group consisting of molecular halogens, hydrohalides, Group V halides, Group VI halides, and combinations thereof. In another embodiment the promoter is in the gas phase when contacting the activated carbon. In another embodiment, the promoter is in an organic solvent when contacting the activated carbon.

In another embodiment, the promoter is selected from the group consisting of $Br_2$, a Group V bromide, a Group VI bromide, and combinations thereof.

In another embodiment, the method further comprises reacting the granular activated carbon with an optional secondary component comprising a halogen or a hydrohalide such that the reactivity and mercury capacity of the sorbent are enhanced. In another embodiment, the promoter and optional secondary component are contacted simultaneously with the activated carbon. In another embodiment the method further comprises adding a mercury-stabilizing reagent selected from the group consisting of S, Se, $H_2S$, $SO_2$, $H_2Se$, $SeO_2$, $CS_2$, $P_2S_5$, and combinations thereof. In an embodiment, a method is provided for control of mercury in a flue gas with substantially lower sorbent requirements. Through enhanced sorbent reactivity, mercury removal per gram of sorbent is increase, thereby decreasing the capital and operating costs by decreasing sorbent requirements.

In an embodiment, a method is provided for reducing mercury in flue gas comprising providing a sorbent, injecting the sorbent into a mercury-containing flue gas stream, collecting greater than 70 wt-% of the mercury in the flue gas on the sorbent to produce a cleaned flue gas, and substantially recovering the sorbent from the cleaned flue gas. In embodiments where less than 70 wt-% mercury removal is desired, the required removal may preferably be attained using less than half as much carbon as would be required with standard (non-enhanced) carbon. In a further embodiment, the method further comprises monitoring the mercury content of the clean flue gas, regenerating the recovered sorbent, and using the monitored mercury content of the cleaned flue gas to control the rate of injection of the sorbent. In another embodiment the injected sorbent is prepared in-flight by reacting an activated carbon and a promoter within a pneumatic transport line from which the reaction product is injected to the mercury-containing flue gas stream.

In another embodiment, the promoter is selected from the group consisting of molecular halogens, halides, and combinations thereof. In another embodiment, the promoter is reacted in the gas phase or as a vapor. In another embodiment, the promoter is added at from about 1 to about 30 grams per 100 grams of activated carbon.

In another embodiment, the injected sorbent is prepared in-flight by reacting an activated carbon, a promoter, and an optional secondary component to enhance the reactivity and capacity of the sorbent within a pneumatic transport line from which the reaction product is injected to the mercury-containing flue gas stream.

In another embodiment, the optional secondary component is selected from the group consisting of iodine, hydrohalides, Group V halides, Group VI halides, and combinations thereof. In another embodiment, the optional secondary component is added at from about 1 to about 15 wt-% of the promoter content. In another embodiment, the method further comprises adding to the sorbent a mercury-stabilizing reagent selected from the group consisting of S, Se, $H_2S$, $SO_2$, $H_2Se$, $SeO_2$, $CS_2$, $P_2S_5$, and combinations thereof.

In an embodiment, the method further comprises co-injecting an optional alkaline material, including without limitation alkaline and alkaline earth components, to improve the efficiency of mercury capture by capturing oxidized mercury and/or capturing gaseous components that might otherwise reduce sorbent capacity. In another embodiment, the optional alkaline material may preferably comprise calcium oxide, sodium carbonate, and the like, as are known in the art.

In another embodiment, the method further comprises using the monitored mercury content of the cleaned flue gas to control the composition of the sorbent. In another embodiment, the injected sorbent is prepared in-flight by reacting an activated carbon and a promoter within a pneumatic transport line from which the reaction product is injected to the mercury-containing flue gas stream, wherein the promoter is selected from the group consisting of molecular halogens, halides, and combinations thereof, wherein the promoter is reacted in the gas phase or as a vapor, wherein the promoter is added at from about 1 to about 30 grams per 100 grams of activated carbon, wherein the rate at which the promoter is added and the rate of sorbent injection are determined by a digital computer based at least in part on the monitored mercury content of the cleaned flue gas.

In an embodiment, a method for reducing the mercury content of a mercury and ash containing gas stream is provided wherein particulate activated carbon sorbent with a mass mean size greater than 40 μm is injected into the gas stream, mercury is removed from the gas by the sorbent particles, the sorbent particles are separated from the ash particles on the basis of size, and the sorbent particles are re-injected to the gas stream. In another embodiment, the mercury-containing sorbent particles are regenerated to remove some or substantially all of the mercury. In another embodiment, an alkaline component is co-injected into the gas stream. In another embodiment, the sorbent may further comprise a promoter. The promoter may preferably comprise a halide, a halogen, or both.

As will be described in more detail below, the present invention thus provides several advantages over previously known techniques, including significantly more effective and economical mercury sorbents for effluent gases, advantageously applicable to treating gas streams from fired equipment and gasification systems.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more detailed description of the preferred embodiments of the present invention, reference will now be made to the accompanying drawings.

DETAILED DESCRIPTION

Herein will be described in detail specific preferred embodiments of the present invention, with the understanding that the present disclosure is to be considered an exemplification of the principles of the invention, and is not intended to limit the invention to that illustrated and described herein. The present invention is susceptible to preferred embodiments of different forms or order and should not be interpreted to be limited to the specifically expressed methods or compositions contained herein. In particular, various preferred embodiments of the present invention provide a number of different configurations and applications of the inventive method, compositions, and their uses.

The present invention provides a cost-effective way to capture pollutants by utilizing exceptionally reactive halogen/halide promoted carbon sorbents using a bromide (or other halogen/halide) treatment of the carbon, that capture mercury via mercury-sorbent surface reactions, at very short contact times of seconds or less. The sorbent does not require in situ activation (no induction period) in the gas stream to achieve high reactivity, as do conventional activated carbon sorbents. The reactivity of the sorbent toward the pollutants is greatly enhanced and the sorption capacity can be regenerated, the promoted sorbent may be regenerated, recycled and/or reused.

The treated carbons, treatment techniques, and optional additives discussed herein have applicability to mercury control from the product or effluent gas or gases from gasification systems, syngas generators, and other mercury-containing gas streams, in addition to the flue gas from combustion systems. Thus, it should be understood that the terms combustion system and flue gas as used throughout this description may apply equally to gasification systems and syngas or fuel gas, as will be understood by those skilled in the art.

Figure 1:
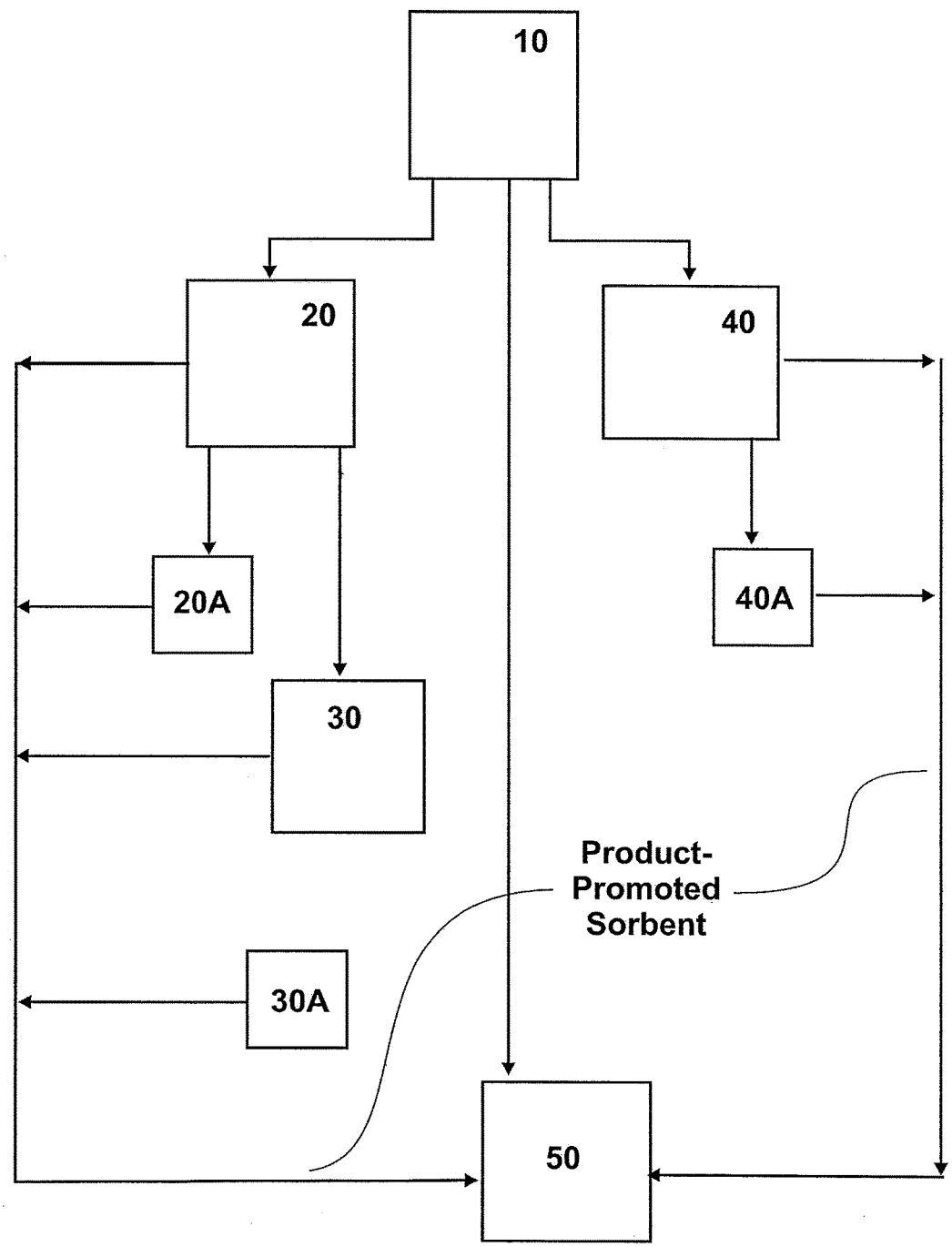
FIG. 1 schematically illustrates methods for preparation of promoted carbon sorbents in accordance with the present invention.

Referring now to FIG. 1, there is shown a block flow diagram illustrating some preferred embodiments of the process of the present invention to prepare promoted sorbents useful for mercury capture from flue gas and/or product gas form a gasification system streams. In a preferred embodiment illustrated by path 10-20, block 10 illustrates providing a base activated carbon, and adding a halogen or halide promoter that reacts with the carbon, illustrated at block 20, to produce a product promoted carbon sorbent. In embodiments where the halogen or halide is added, for example, as a vapor, no further steps may be necessary. In embodiments where the halogen or halide is added in, for example, a solvent, it may be desirable to employ solvent removal as illustrated by block 20A.

Referring still to FIG. 1, another preferred embodiment of the process of the present invention is illustrated by path 10-20-30, comprising providing a base activated carbon as shown by block 10, adding a halogen or halide promoter that reacts with the carbon, illustrated at block 20, and adding a secondary component illustrated at block 30 that reacts with the result of block 20 to produce a product promoted carbon sorbent. In embodiments where both the halogen or halide promoter and the secondary component are added, for example, as a vapor, no further steps may be necessary. In embodiments where the halogen or halide promoter and/or secondary component are added in, for example, a solvent, it may be desirable to employ solvent removal as illustrated by block 30A.

Referring still to FIG. 1, another preferred embodiment of the process of the present invention is illustrated by path 10-40, comprising providing a base activated carbon as illustrated at block 10, and adding a halogen or halide promoter and a secondary component to the activated carbon together, with which they react as illustrated by block 40, producing a product promoted carbon sorbent. As above, in embodiments where vapor additions are made to the activated carbon no further steps may be desired. In embodiments where one or more components are added in solvent, a solvent removal step may be provided as illustrated by block 40A.

Referring still to FIG. 1, also illustrated are preferred embodiments in which, as illustrated by block 50, a flue gas stream is treated with product promoted carbon sorbent prepared as described above.

In some preferred embodiments the activated carbon provided may preferably be any of several types, as understood by those skilled in the art. For example, the activated carbon may include powdered activated carbon, granular activated carbon, carbon black, carbon fiber, carbon honeycomb or plate structure, aerogel carbon film, pyrolysis char, regenerated activated carbon from product promoted carbon sorbent, or other types as known in the art.

In some preferred embodiments the activated carbon provided may preferably be any of several types, as understood by those skilled in the art. For example, the activated carbon may include powdered activated carbon, granular activated carbon, carbon black, carbon fiber, carbon honeycomb or plate structure, aerogel carbon film, pyrolysis char, an activated carbon or regenerated activated carbon with a mass mean particle size greater than fly ash in a flue gas stream to be treated.

In some preferred embodiments the activated carbon provided may preferably be any of several types, as understood by those skilled in the art. For example, the activated carbon may include powdered activated carbon, granular activated carbon, carbon black, carbon fiber, carbon honeycomb or plate structure, aerogel carbon film, pyrolysis char, an activated carbon or regenerated activated carbon with a mass mean particle diameter preferably greater than 40 micrometers, more preferably greater than 60 micrometers, or a particle size distribution greater than that of the fly ash or entrained ash in a flue gas stream to be treated, such that the activated carbon and ash can be separated by physical means.

In some preferred embodiments, the halogen or halide promoter that is added to, and reacts with, the base activated carbon may preferably comprise, by way of illustration and not limitation, a molecular halogen in vapor or gaseous form, a molecular halogen in an organic solvent, a Group V or Group VI halide, such as $PBr_3$ or $SCl_2$, respectively, in vapor, liquid, or solution form (though not in an aqueous solvent).

Embodiments are also provided in which the organic solvent may preferably comprise a chlorinated hydrocarbon, such as dichloromethane, a hydrocarbon solvent, including for example, petroleum ether, ligroin, pentane, hexane, toluene, and benzene, carbon disulfide, a waste solvent, an ether, a recycled solvent, a supercritical solvent, such as supercritical $CO_2$, water (though not in the case of a Group V or Group VI halide), and others as will be apparent to those of skill in the art.

Figure 2:
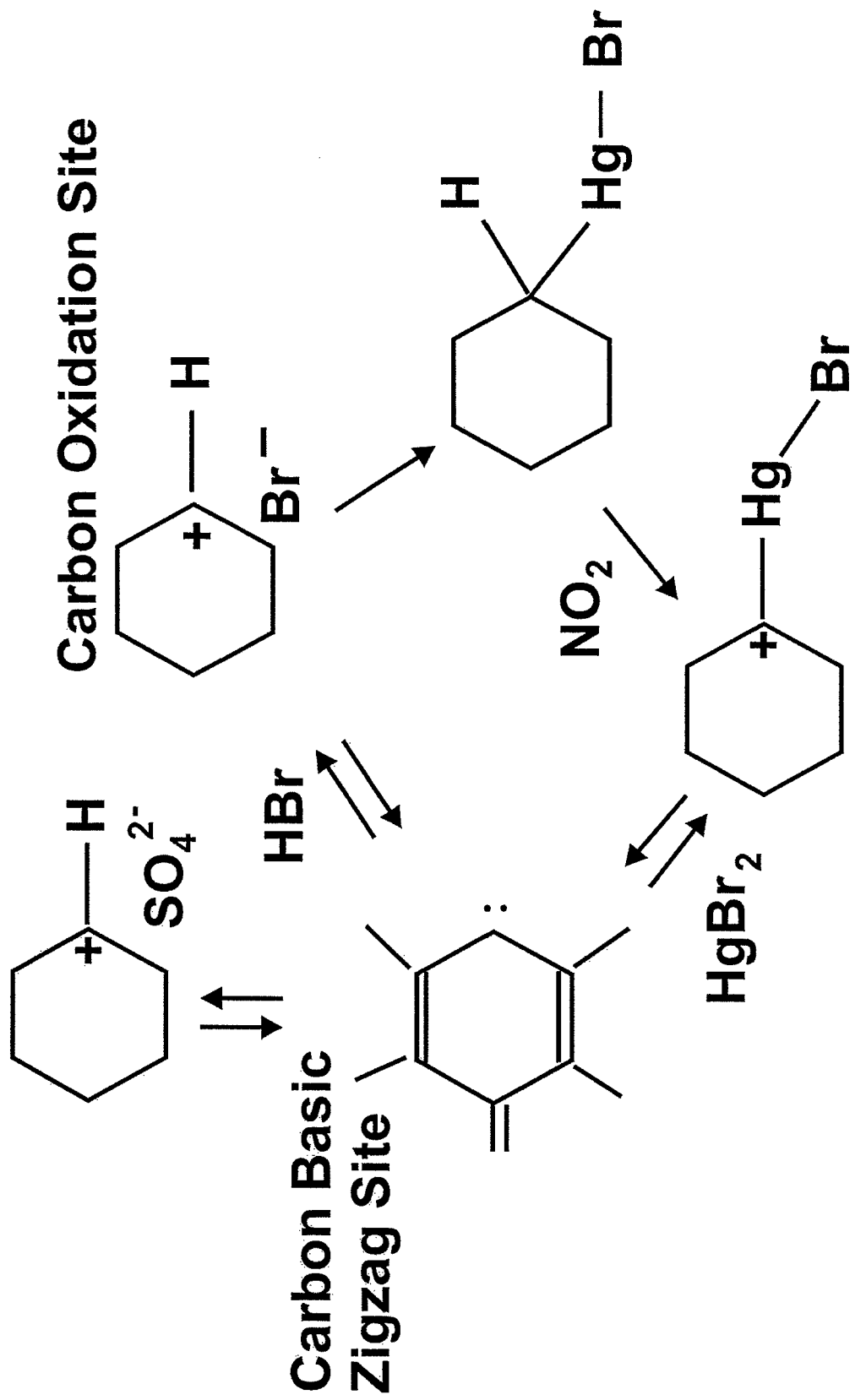
FIG. 2 illustrates a proposed mechanistic model of the chemical reactions resulting in the oxidation and capture of mercury.

Referring now to FIG. 2, there is illustrated a theory developed from scientific evidence to explain the nature of the promoting compounds. For example, as illustrated in FIG. 2, hydrogen bromide reacts with the unsaturated structure of the activated carbon. This may be, by way of illustration only, a carbene species on the edge of the graphene sheet structures of the carbon. Molecular bromine or a bromine compound reacts to form a similar structure, with a positive carbon that is active for oxidizing the mercury with subsequent capture by the sorbent.

It has now been found that the formation of the new bromide compound with carbon increases their reactivity toward mercury and other pollutants. Additionally, the resulting bromide compound is uniquely suited to facilitate oxidation of the mercury. The effectiveness of the oxidation apparently results from the promotion effect of the halide, exerted on the developing positive charge on the mercury during the oxidation, known in the chemical art as a specific catalytic effect. Thus, as the mercury electrons are drawn toward the positive carbon, the halide anion electrons are pushing in from the other side, stabilizing the positive charge developing on the mercury and lowering the energy requirement for the oxidation process. Bromide is especially reactive, owing to the highly polarizable electrons in the outer 4p orbitals of the ion. Thus, adding HBr or $Br_2$ to the carbon forms a similar carbon bromide, in which the positive carbon oxidizes the mercury with the assistance of the bromide ion.

Figure 3:
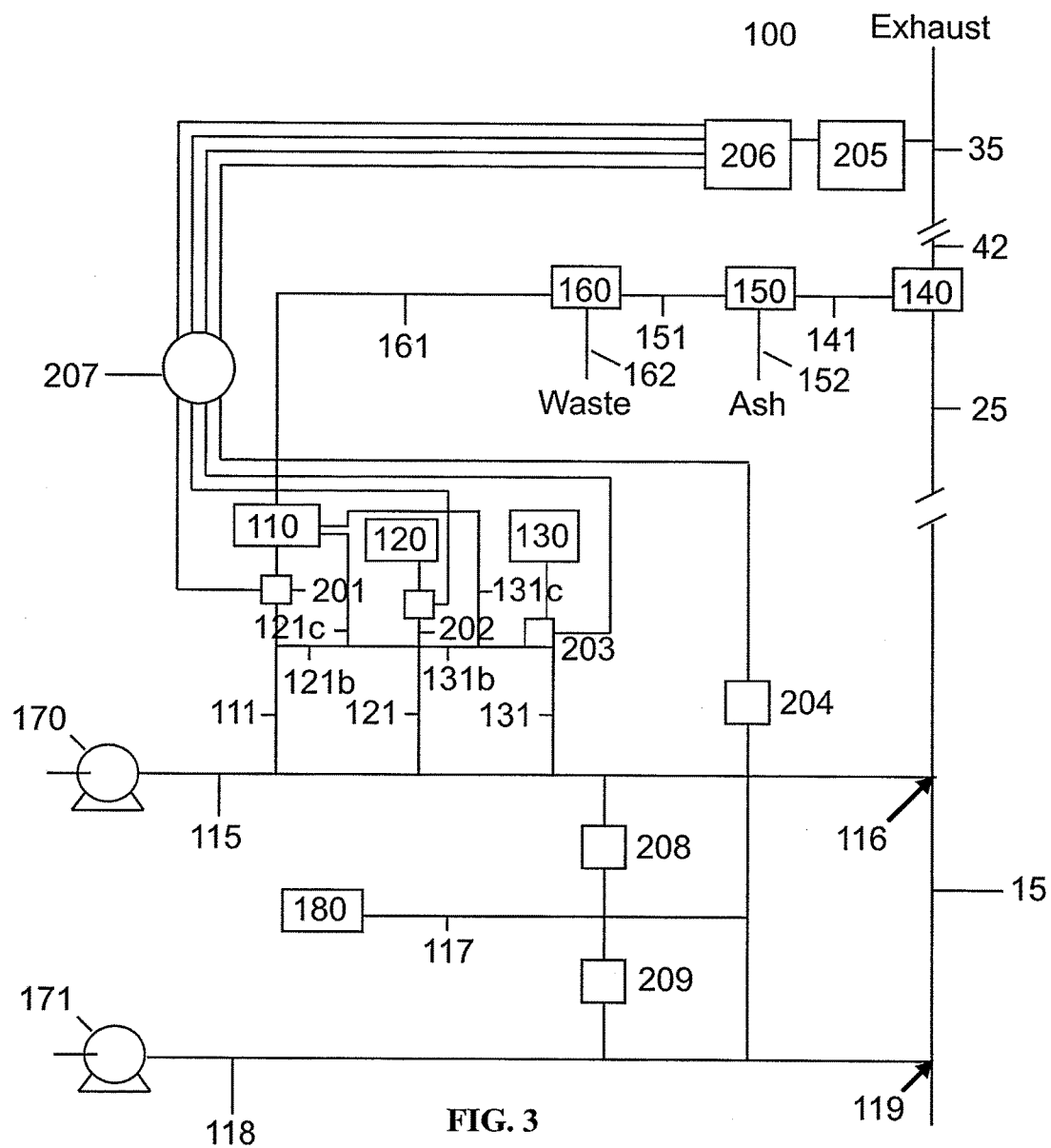
FIG. 3 schematically illustrates preparation of promoted carbon sorbents and processes for flue gas mercury reduction in flue gases and/or product gases from a gasification system in accordance with the present invention, including in-flight preparation of promoted carbon sorbent.

Referring now to FIG. 3, a schematic flow diagram is provided of mercury control system 100 comprising preparation of promoted carbon sorbents, and flue gas mercury reduction, in accordance with preferred embodiments of the present invention. There is provided base activated carbon reservoir 110, an optional halogen/halide promoter reservoir 120, an optional secondary component reservoir 130, and an optional akali component reservoir 180, each of which with corresponding flow control device(s) 201, 202, 203, and 208/209, respectively. In conjunction with the optional alkali component reservoir 180, optional flow control devices 208 and 209 can be used independently, together, or not at all.

Reservoirs 110, 120, 130, and 180 connect through their respective flow control devices and via associated piping, to transport line 115. Optional alkali component reservoir 180 may also connect, through respective flow control devices and via associated piping, to transport line 118. A source of air, nitrogen, or other transport gas(es) is provided by gas source 170 to transport line 115 for the purpose of entraining materials discharged from reservoirs 110, 120, 130, and 180 and injecting such materials, via injection point 116, into contaminated flue gas stream 15. A source of air, nitrogen, or other transport gas(es) may be provided by gas source 171 to transport line 118 for the purpose of entraining materials discharged from reservoirs 180 and injecting such materials, via injection point 119, into flue gas stream 15. Gas sources 170 and 171 may be the same or different, as desired. Alternatively, transport gas(es) may be provided to both transport lines 115 and 118 by gas source 170 (connection from source 170 to line 118 not shown). Although gas sources 170 and 171 are shown in FIG. 3 as compressors or blowers, any source of transport energy known in the art may be acceptable, as will be appreciated by those of skill in the art.

For clarity, single injection points 116 or 119 are shown in FIG. 3, although one skilled in the art will understand that multiple injection points are within the scope of the present invention. Optical density measuring device (s) 204 is connected to transport line 115 and/or 118 to provide signals representative of the optical density inside transport line 115 and/or 118 as a function of time.

Downstream from injection point 116 and 119 is provided particulate separator 140. By way of illustration and not limitation, particulate separator 140 may comprise one or more fabric filters, one or more electrostatic precipitators (hereinafter "ESP"), or other particulate removal devices as are known in the art. It should be further noted that more than one particulate separator 140 may exist, sequentially or in parallel, and that injection point 116 and 119 may be at a location upstream and/or downstream of 140 when parallel, sequential, or combinations thereof exist. Particulate separator 140 produces at least a predominantly gaseous ("clean") stream 142, and a stream 141 comprising separated solid materials. A sorbent/ash separator 150 separates stream 141 into a largely ash stream 152, and a largely sorbent stream 151. Stream 151 may then preferably be passed to an optional sorbent regenerator 160, which yields a regenerated sorbent stream 161 and a waste stream 162.

An optional Continuous Emission Monitor (hereinafter "CEM") 205 for mercury is provided in exhaust gas stream 35, to provide electrical signals representative of the mercury concentration in exhaust stream 35 as a function of time. The optional mercury CEM 205 and flow controllers 201, 202, 203, 208, and 209 are electrically connected via optional lines 207 (or wirelessly) to an optional digital computer (or controller) 206, which receives and processes signals and preferably controls the preparation and injection of promoted carbon sorbent into contaminated flue gas stream 15.

In operation, promoted carbon sorbent and/or an optional alkali component is injected into contaminated flue gas stream 15. After contacting the injected material with the contaminated flue gas stream 15, the injected material reduces the mercury concentration, transforming contaminated flue gas into reduced mercury flue gas, 25. The injected material is removed from the flue gas 25, by separator 140, disposed of or further separated by optional separator 150, and disposed of or regenerated by an optional regenerator 160, respectively. The reduced mercury "clean" flue gas stream 142 is then monitored for mercury content by an optional CEM 205, which provides corresponding signals to an optional computer/controller 206. Logic and optimization signals from 206 then adjust flow controllers 201, 202, 203, 208, 209 to maintain the mercury concentration in exhaust stream 35 within desired limits, according to control algorithms well known in the art. Flow controllers 201, 202, 203, 208, 209 can also be adjusted manually or be some other automated means to maintain the mercury concentration in exhaust stream 35 within desired limits, according to control algorithms well known in the art.

Referring still to FIG. 3, there are illustrated several preferred embodiments for preparation and injection of promoted carbon sorbents and/or alkali components in accordance with the present invention. Stream 111 provides for introduction of base activated carbon from reservoir 110, as metered by flow controller 201 manually or under the direction of computer 206. The halogen/halide may be combined and react with the base activated carbon according to any of several provided methods. The halogen/halide may preferably be combined via line 121 directly into transport line 115, within which it contacts and reacts with the base activated carbon prior to injection point 116. This option is one form of what is referred to herein as "in-flight" preparation of a promoted carbon sorbent in accordance with the invention. Further, the halogen/halide may be combined via line 121b with base activated carbon prior to entering transport line 115. Still further, the halogen/halide may be contacted and react with the base activated carbon by introduction via line 121c into reservoir 110. This option is preferably employed when, for example, reservoir 110 comprises an ebulliated or fluidized bed of base activated carbon, through which halogen/halide flows in gaseous form or as a vapor. Of course, the halogen/halide may also preferably be contacted with the base activated carbon in liquid form or in a solvent, as discussed previously, and solvent removal (not shown in FIG. 3) may then be provided if necessary as mentioned with respect to embodiments discussed with reference to FIG. 1.

Similarly, the optional secondary component may be contacted and react directly in transport line 115 via line 131, or optionally as described above with respect to the halogen/halide, via lines 131b and 131c.

Similarly, the optional alkali component from 180 may either be added in transport line 115 directly, or may be injected separately by transport line 118, combining downstream in flue gas 15 for synergistic effects with base activated carbon, promoted carbon, or optional secondary components. Being able to vary onsite the amount of the optional alkali component relative to base activated carbon, promoted carbon, or optional secondary components is a key feature to overcome and optimize for site-specific operating and flue gas conditions.

In some preferred embodiments wherein contacting between components and reaction is performed in a liquid or solvent phase, stirring of such liquid and/or slurry mixtures may be provided. In other embodiments, the halogen/halide promoter and optional secondary component(s) may preferably be sprayed in solution form into or on the base activated carbon. In some such embodiments, drying, filtering, centrifugation, settling, decantation, or other solvent removal methods as are known in the art may then be provided.

In embodiments wherein the halogen/halide promoter is in gaseous or vapor form, it may be diluted in air, nitrogen, or other gas as appropriate. The halide/halogen gas, for example, gaseous HBr or $Br_2$, may be passed through an ebulliated or fluidized bed of granular or fibrous activated carbon, with the promoted carbon sorbent so produced removed from the top of the bed via gas entrainment for injection.

In some embodiments, the secondary component(s) may preferably comprise iodine or other halogens, hydrohalides, including without limitation HI, HBr, HCl, a Group V or Group VI element with a molecular halogen, such as $SCl_2$ and others. In some preferred embodiments, the promoted carbon sorbent may comprise from about 1 to about 30 g halogen/halide per 100 g base activated carbon. In some preferred embodiments, the promoted carbon sorbent may comprise an secondary component in concentration of from about 1 to about 15 wt-% of the concentration of the halogen/halide component.

In still other embodiments, the product promoted carbon sorbent may be applied to a substrate. In other embodiments, such prepared substrate(s) may be caused to contact a contaminated flue gas or gasification system product gas stream for mercury reduction purposes. Such substrates may be monolithic, rotating, or exposed to the gas stream in any number of ways known to those skilled in the art.

In some embodiments, a method is provided whereby a mercury stabilizing reagent is added to a promoted carbon sorbent to produce a bifunctional sorbent. Such stabilizing reagent(s) may be sequentially added, either before or after the addition and reaction of the halogen/halide. In some preferred embodiments, the halogen/halide preferably comprises Br or HBr, and the mercury-stabilizing reagent may comprise S, Se, $H_2S$, $SO_2$, $H_2Se$, $SeO_2$, $CS_2$, $P_2S_5$, and combinations thereof.

Halogens in Mercury Capture

Methodologies for using halogens for the treatment of flue gas have been problematic, owing to their reactivity with other gases and metals, resulting in corrosion and health issues. A "halogen" is defined as a member of the very active elements comprising Group VIIA (CAS nomenclature is used throughout; Group VIIA (CAS) corresponds to Group VIIB (IUPAC)) of the periodic table. In the molecular elemental form of the halogens, including $F_2$, $Cl_2$, $Br_2$, and $I_2$, the reaction with a hot flue gas components leave little to react with elemental mercury. The atomic elemental halogen form, which includes the fluorine, chlorine, bromine, and iodine atoms, is about a million times more reactive to mercury but the concentration of the atomic forms is typically extremely low. In a large portion of electric utility coal combustion facilities, the concentrations are generally not sufficient to oxidize a significant amount of mercury.

The term "halide" as used herein is defined as a compound formed from the reaction of a halogen with another element or radical. In general, halide compounds are much less reactive than the molecular halogens, having a low chemical potential. Halides are considered reduced forms that do not, alone, oxidize other compounds. In the conventional view therefore, a halide-salt-treated activated carbon will not effectively oxidize elemental mercury and capture elemental mercury.

Halogen Promoted Sorbent Characteristics

The sorbent described here has a very high initial reactivity for oxidizing mercury and therefore can be used in very small amounts to achieve very high capture efficiencies, thus lowering operation costs and lessening waste disposal problems. In addition, further disposal reductions are obtainable by regenerating and reusing the sorbents produced using the inventive technology. The time interval required for the mercury and the promoted carbon sorbents of the present invention to successfully interact in a flue gas duct, with the subsequent collection of the mercury on the sorbent and ash is very short—less than seconds. Clearly, such collection times require the sorbent to have both high capacity and high reactivity toward mercury. The promoted carbon sorbent can be utilized in a very finely powdered form to minimize mass transfer limitations. However, again, the reactivity should be very high to capture all of the mercury encountered by the fine particles. Additionally, use of these enhancement technologies allows capture to be effective for larger sorbent particles which also allows separation of the sorbent from the ash to enable subsequent regeneration as well as ash utilization. One feature of this invention is the process to prepare a sorbent containing a halide compound formed on the carbon structure that provides a sorbent that is highly active on initial contact with the mercury contaminated gas stream, which allows for very effective capture of the mercury.

It appears that the inventive sorbents chemically combine molecular bromine, for example, from solution, with activated carbon (edge sites). X-ray photoelectron spectroscopy has established that the addition of bromine, chlorine, HBr, or HCl formed a chemical compound in the carbon structure. Thus, the sorbent produced from halogen and activated carbon does not represent a molecular halogen form, but rather a new chemically modified carbon (or halocarbon) structure. This phenomenon may not occur with the less reactive iodine, where an $I_2$ molecular complex can exist on the carbon basal plane. In the case of bromine, modified cationic carbon has a high chemical potential for oxidation of mercury. Thus, an entirely new model is presented for the reactivity of the bromine-treated carbon with mercury. The reactive carbon form can preferably be generated by the addition of bromine, hydrogen bromide, or combinations of bromine and other elements, as described herein. Halogen treatment resulted in higher-activity carbons because the halide anions (especially bromide and iodide) were effective in promoting the oxidation by stabilizing the developing positive charge on the mercury in the transition state for oxidation. Based on this model, several innovative, inexpensive, activity-enhancing features have been developed.

Optional Second Component

It has been demonstrated that addition of an optional second component, in addition to the bromine, results in improved reactivity and capacity for the sorbent, typically exceeding that of both the untreated carbon and the brominated carbon. The second compound comprises either a second halogen or a compound derived from a second halogen, such as HI. Thus, in addition to having a reactive carbon form present, the second component generates a Lewis base with greater ability to stabilize the developing positive charge on the mercury. Thus, the second component is an element with more polarized electrons (4p and 5p).

Optional Alkali Component

It has been demonstrated that addition of an optional alkali component with a base or promoted activated carbon results in improved mercury capture, typically exceeding that of both the untreated carbon and the promoted carbon. Test data indicate that flue gas contaminants, flue gas constituents ($SO_2$, $NO_x$, HCl, etc), operating temperature, mercury form, and mercury concentration may impact the effectiveness of the alkali addition. This suggests the need to be able to adjust and tailor the alkali-to-activated-carbon ratio onsite in order to overcome and optimize for a given set of site conditions.

The synergy that can be gained when co-injecting the two materials can be explained as follows. First, testing shows that binding sites on activated carbon (hereinafter "AC") can be consumed by chlorine species, sulfur species (i.e. sulfates), and other flue gas contaminants (arsenates, selenates, etc). The addition of optional alkali material will interact and react with these species/contaminants thus minimizing their consumption of AC mercury binding sites. Second, testing also shows that standard AC will continue to oxidize mercury, even though the binding sites are fully consumed. This oxidized mercury can then react with alkali material and subsequently be captured by particulate control devices. Consequently, the addition of the optional alkali component acts to protect mercury binding sites and capture oxidized mercury, thereby resulting in improved mercury reduction at lower cost. Alkali is generally much lower in cost (~ an order of magnitude less) than activated carbon, thus more of it can be used still resulting in overall lower costs.

"In-Flight" Sorbent Preparation

Furthermore, we have demonstrated that the halogen promoted carbon sorbent can be readily produced "in-flight". This is accomplished by, for example, contacting the vapors of any combination of halogens and optionally a second component, in-flight, with very fine carbon particles. The particles may be dispersed in a stream of transport air (or other gas), which also conveys the halogen/halide promoted carbon sorbent particles to the flue gas duct, or other contaminated gas stream, from which mercury is to then be removed. There is no particular temperature requirement for this contact. This technology is obviously very simple to implement, and results in a great cost savings to facilities using this technology for mercury capture.

Advantages of on-Site Preparation

In-flight preparation of the halogen/halide promoted carbon sorbent on location produces certain advantages. For example, the treatment system can be combined with the carbon injection system at the end-use site. With this technique, the halogen/halide is introduced to the carbon-air (or other gas) mixture in a transport line (or other part of the sorbent storage and injection system). This provides the following benefits over current conventional concepts for treating sorbents off-site:

Capital equipment costs at a treatment facility are eliminated.

Costs to operate the treatment facility are eliminated.

There are no costs for transporting carbon and additive to a treatment facility.

The inventive process uses existing hardware and operation procedures.

The inventive technology ensures that the sorbent is always fresh, and thus, more reactive.

No new handling concerns are introduced.

There are no costs for removing carbon from treatment system.

The inventive process allows rapid on-site tailoring of additive-sorbent ratios in order to match the requirements of flue gas changes, such as may be needed when changing fuels or reducing loads, thus further optimizing the economics.

The inventive technology reduces the amount of spent sorbents that are disposed.

With the foregoing and other features in view, there is provided, in accordance with the present invention, embodiments including a process for preparing and regenerating halogen/halide promoted carbon sorbents, whose activity for mercury capture is enhanced by the addition of halogen (e.g. bromine) to the carbon structure.

Sorbent Injection Location

Some of the preferred embodiments contemplate the use of a halogen promoted sorbent in a powdered form that has been injected into a flue gas stream before or after ash particulates have been removed. Other embodiments of the inventive composition of the halogen promoted carbon sorbent comprise a powdered modified activated carbon prepared by adding $Br_2$ or HBr plus a second optional component. Other embodiments allow the addition of the optional alkali component in conjunction with a base activated carbon and/or with the use of a halogen based sorbent and any other combinations of the sorbent technologies provided in this patent. Alternatively, embodiments include methods wherein the sorbent is on a moving contactor consisting of particles or fibers containing one or more of the compositions listed above.

Sorbent Regeneration

Any of the above embodiments of the halogen/halide promoted carbon sorbent can be easily regenerated; the poisoning contaminants from the flue gas are preferably removed and an inexpensive promoting agent added, to restore mercury sorption activity. This process of promoting the activity of the carbon itself contrasts with the earlier, more expensive, conventional methods of adding a reagent (such as peroxide, gold, triiodide, etc.) to a sorbent. The halogen/halide promoted carbon sorbent of the present invention, treated with bromine and/or optional components, is noncorrosive. Detailed examples of sorbent regeneration techniques are described in co-pending, commonly owned PCT patent application No. PCT/US04/12828, titled "PROCESS FOR REGENERATING A SPENT SORBENT", which is hereby incorporated by reference in its entirety.

Sorbent Injection Control Schemes

Another advantage of the present invention relates to the use of a feedback system to more efficiently utilize certain aspects of the invention. Where possible and desirable, the mercury control technology of the present invention may preferably utilize continuous measurement of mercury emissions as feedback to assist in control of the sorbent injection rate. Tighter control on the sorbent and optional component(s) levels can be achieved in this way, which will ensure mercury removal requirements are met with minimal material requirements, thus minimizing the associated costs. In an embodiment, the mercury emissions are continuously measured downstream of the injection location, preferably in the exhaust gas at the stack.

Promoted Carbon Sorbents

Reactions of halogens and acidic species with the basic binding sites on the activated carbon sorbent create sites for oxidizing mercury. Other metal ions, such as boron, tin, arsenic, gallium, Sb, Pb, Bi, Cd, Ag, Cu, Zn, or other contaminants, will also react with the oxidation sites generated on the carbon.

According to our model, adding the bromine from the bromine reagent or a proton from a hydrogen halide acid to a basic carbene site on the carbon edge structure forms a carbocation that accepts electrons from the neutral mercury atom forming the oxidized mercury species that is bound to the sorbent surface. The reactive site may also generate reactive bromine radicals or carbon radicals at the active sites on the carbon. Thus, the activated carbon serves to stabilize the bromine, yet provides a highly reactive bromine—containing reagent that can oxidize the mercury and promote its capture on the activated carbon. The sorbent that contains bromine is expected to be more reactive than the corresponding sorbent containing chlorine and much less expensive than the sorbent containing iodine.

EXAMPLES

To more clearly illustrate the present invention, several examples are presented below. These examples are intended to be illustrative and no limitations to the present invention should be drawn or inferred from the examples presented herein.

Example 1

Preparation and Testing of Halogenated Carbon (& Comparative Example) Gas Phase Halogenation Finely powdered activated carbon (such as NORIT Darco FGD, NORIT Americas, Inc., Marshall, Tex. (USA), although others are suitable, as will be recognized by those skilled in the art), was placed in a rotating plastic barrel with side blades (a 5 ft$^3$ (0.14 m$^3$) cement mixer) fitted with a tight plastic lid to prevent loss of the fine powder during the preparation. In a separate vessel, gas phase bromine was generated by passing a nitrogen stream over a weighed amount of liquid bromine that is warmed to about 40°-50° C. The vapor pressure of the bromine was such that a dark red gas is generated and passed out of the generator. The outlet from the gaseous bromine generator is connected via a ¼ inch (0.64 cm) plastic hose to a stationary metal tube inserted through a flange in the center of the plastic lid and passing into the center of the barrel. The flange is not air tight so that the excess of nitrogen is released after the bromine is transferred to the tumbling carbon. Thus, the bromine gas stream continuously passed into the rotating barrel where it contacted the tumbling carbon. The unit is then operated until the desired amount of bromine has combined with the carbon. Typically, this is 0.4 to 1 kg of bromine to 20 kg of carbon (2-5 wt. %). When the reaction is completed, the carbon is weighed. The treated carbon is odorless and does not cause skin irritation since the bromine has completely reacted with the carbon to produce the brominated carbon.

XPS spectra demonstrate that the brominated carbon contains both covalent carbon-bound (organic) bromide as well as anionic bromide. The product contains the same moisture originally present in the activated carbon (5-17 wt %), but does not require further drying for use. The moisture is driven out at higher temperatures (>150° C.), and the bromine was not released until very high temperatures Bench-Scale Testing of Mercury Oxidation and Capture Efficiency A bench-scale apparatus and procedure based on the above description was used to test the initial activities and capacities of several promoted activated carbon sorbents using powdered carbon, including bromine-containing activated carbons prepared from a variety of carbons, including commercially available sorbents, aerogel film sorbents, and the original precursor carbons for comparison.

A detailed description of the apparatus and its operation is provided in Dunham, G. E.; Miller, S. J. Chang, R.; Bergman, P. *Environmental Progress* 1998, 17, 203, which is incorporated herein by reference in its entirety. The bench scale mercury sorbent tests in the flue gas compositions were performed with finely (−400 mesh) powdered sorbents (37 mg) mixed with 113 mg sand and loaded on a quartz filter (2.5 inch (6.35 cm)). The loaded filter and holder were heated in an oven (125° C.) in the simulated flue gas stream (30 SCFH (standard cubic feet/hr) or 0.79 NCMH (normal cubic meters per hour)) containing the following: $O_2$ (6%), $CO_2$ (12%), $SO_2$ (600 ppm), NO (120 ppm) $NO_2$ (6 ppm), HCl (1 ppm), $Hg^0$ (11 µg/m$^3$), $H_2O$ (15%), and $N_2$ (balance). Elemental mercury was provided by a standard permeation tube source placed in a double jacketed glass condenser, and heated to the desired temperature. Mercury concentrations in the gas streams were determined with a continuous mercury emission monitor (Sir Galahad mercury CEM mfr. P.S. Analytical Deerfield Beach Fla. USA), and a $SnCl_2$ cell was used to convert oxidized species to elemental, so that both elemental and oxidized mercury concentration data could be obtained for both the influent and the effluent concentrations from the sorbent bed. Mercury concentrations were calibrated for the flow rates used. Spent sorbents were analyzed for mercury to determine the mass balance.

Figure 4:
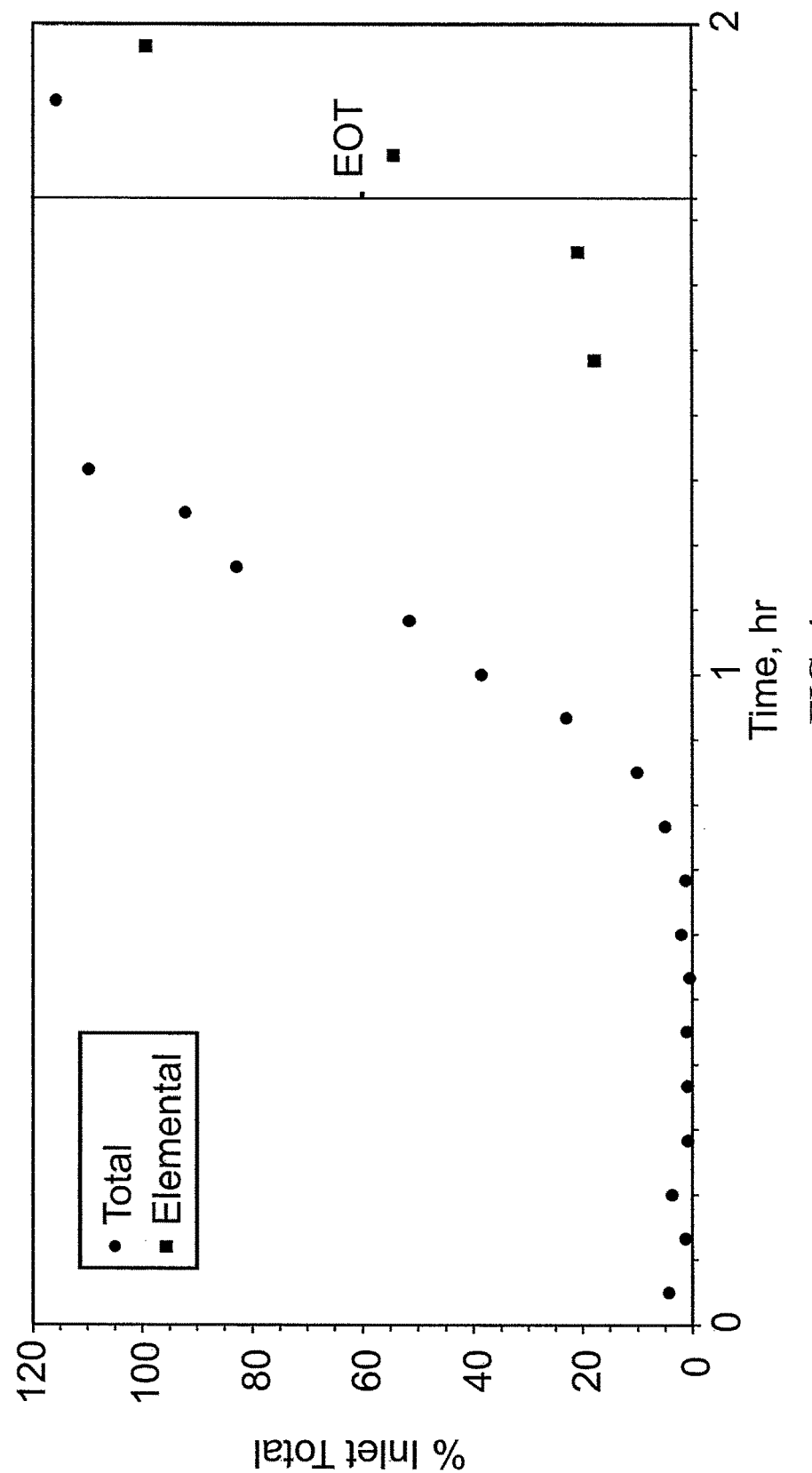
FIG. 4 is a diagram illustrating breakthrough curves for 5 wt/wt % brominated NORIT Darco FGD sorbent (37 mg+113 mg sand) in low-HCl (1 ppm) synthetic flue gas.

Referring now to FIG. 4, the effluent mercury concentration data are plotted as a percent of the influent mercury versus time. The resulting curve (breakthrough curve) for the halogenated sorbents typically showed 0%-1% Hg in the effluent (99+% capture) at the beginning, and increasing only after 30-60 minutes (breakthrough point), depending on the sorbent. FIG. 4 illustrates the breakthrough curves for 5 wt/wt % brominated NORIT Darco FGD sorbent (37 mg+113 mg sand) with synthetic flue gas containing 1 ppm HCl. Total Hg (solid circles) and elemental Hg (solid squares) in the effluent are presented as a per cent of the inlet Hg. "EOT" indicates the end of test (the later data points shown are for calibration checks).

Figure 5:
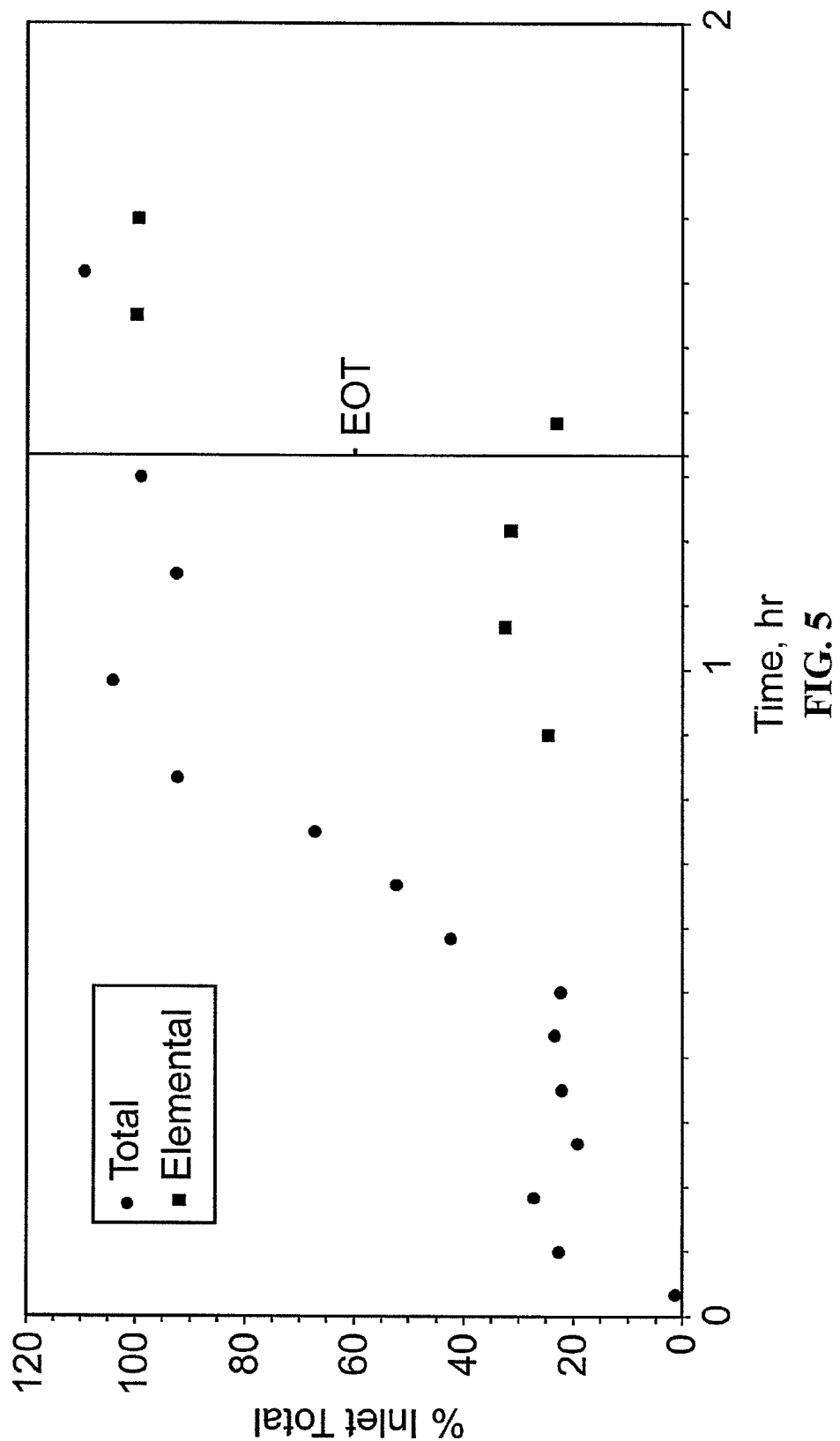
FIG. 5 is a diagram illustrating breakthrough curves for non-halogenated NORIT Darco FGD sorbent (37 mg+113 mg sand) in low-HCl (1 ppm) synthetic flue gas.

FIG. 5 presents the comparative breakthrough curves for the corresponding nonhalogenated sorbents typically initiated at 5%-50% of inlet mercury, depending on the HCl concentration in the synthetic flue gas, thus indicating considerably lower reactivity for oxidation and capture of the mercury for the nonhalogenated sorbents. After breakthrough of either halogenated or nonhalogenated sorbent, most of the mercury in the effluent was oxidized mercury.

Example 2

Gas Phase Halogenation of Fluidized Carbon

A bed of activated carbon supported in a vertical tube by a plug of glass wool was fluidized by a nitrogen stream. The top of the fluidized bed tube was connected to a catching trap for carbon fines that blow out the top of the tube. The bromine gas generator as described in Example 1 was attached to the fluidized carbon bed and the desired amount of gaseous bromine was passed into the bed. The contents of the trap were then mixed with the material in the bed and weighed. The resulting brominated carbon exhibited properties similar to the brominated carbon of Example 1.

Example 3

Liquid Phase (Water) Halogenation

A 5% solution of bromine in water was prepared by carefully adding 50 g of bromine to 1 liter of cold water. One kg of activated carbon was added to the bromine solution in a large metal can. The resulting slurry was stirred with a large paddle during the addition and for a short time afterwards until all the bromine had reacted with the carbon, as indicated by the disappearance of the red color. The slurry was then filtered using a Buchner funnel under vacuum. The moist carbon that was collected on the filter was dried in an oven at 110° C. for several hours to constant weight. As in Example 1, some moisture remains in the carbon, however. The dried carbon was then tumbled in the rotating barrel with metal pieces to break up and fluff the carbon.

Example 4

Addition of the Optional Second Halide Component

Brominated carbon was produced by solution phase bromination similar to that described with reference to Example 3. However, before filtration, a solution of hydriodic acid (HI) was added to the slurry in an amount equal to 10% of the bromine amount. The slurry was stirred to complete the reaction and then filtered and dried as described in Example 3.

Example 5

Liquid Phase Phosphohalogenation

A solution of phosphorus tribromide (500 g) in ligroin (10 liters) was stirred in a large metal can and 10 kg of activated carbon was added. The resulting slurry was stirred with a large paddle at ambient temperature to complete the reaction. The slurry was filtered under vacuum on a large Buchner funnel in several batches. The wet filter cake was dried at 110° C. in an oven to constant weight. The dried product was fluffed in the rotating barrel as described in Example 3.

Example 6

Preparation and Sorption on Larger-Particle Carbon

Tests were conducted on a pilot-scale combustor while firing a subbituminous coal, to evaluate mercury control by injecting larger-than-normal sized treated activated carbon. Standard AC sorbents generally are of fine size with a mean particle diameter of less than 20 micrometers, which is also typical of the flyash that is generated from pulverized coal combustion. Consequently, because the sizes of standard AC and flyash are similar, separation of the two is difficult. Injection of larger sized AC is generally not considered because the sorbent effectiveness decreases with size. In a scheme to recycle the injected carbon, the carbon is separated from the flyash. A separation based on size fractionation requires a treated larger particle sorbent. To test this concept, a treated larger sized (>60 μm) sorbent was developed, prepared, and tested.

Treatment—Gas Phase Halogenation

Granular activated carbon (Calgon F400) was ground and sieved through conventional mesh screens. The mesh size fraction −170 to +240 (corresponding to about 60 to about 88 micrometers) was collected and placed in a rotating vessel as described in Example 1 above. In a separate vessel, gas phase bromine was generated by passing a nitrogen stream over a weighed amount of liquid bromine that was warmed to about 40°-50° C., and the outlet from this gaseous bromine generator was connected via a ¼ inch (6.35 mm) plastic hose to a stationary metal tube inserted through a flange in the center of the lid and passing into the center of the rotating vessel, also as described in Example 1. The unit was operated until the desired amount of bromine had combined with the carbon, in this case 0.05 kg of bromine to 1 kg of carbon (5 wt. %). When the reaction was completed, the carbon was weighed. The treated carbon was odorless as has been described above.

PTC Apparatus

The pilot-scale combustor, known as the "Particulate Test Combustor" (hereinafter "PTC"), is a 550,000-Btu/hr (about 161 kW) pulverized coal ("PC")-fired unit, designed to generate combustion flue gas properties and fly ash that are representative of those produced in a full-scale utility boiler. The combustor is oriented vertically to minimize wall deposits. A refractory lining helps to ensure adequate flame temperature for complete combustion and prevents rapid quenching of the coalescing or condensing fly ash. Based on the superficial gas velocity, the mean residence time of a particle in the combustor is approximately 3 seconds. The coal nozzle of the PTC fires axially upward from the bottom of the combustor, and secondary air is introduced concentrically to the primary air with turbulent mixing. Coal is introduced to the primary air stream via a screw feeder and eductor. An electric air preheater is used for precise control of the combustion air temperature. Originally, the PTC used cold-water annular heat exchangers to provide flue gas temperature control to the baghouse (also referred to as a "fabric filter") or electrostatic precipitator (ESP). However, analysis of ash deposits collected from the heat exchangers indicated that some mercury was collected on the duct walls. To minimize this effect, the heat exchangers were modified to provide for higher duct wall temperatures.

The PTC instrumentation permits system temperatures, pressures, flow rates, flue gas constituent concentrations, and particulate control device (baghouse, Advanced Hybrid Particle Collector/AHPC™, and/or electrostatic precipitator/ESP) operating data to be monitored continuously and recorded on a data logger.

PTC Procedure

Flue gas samples were taken at combinations of two of the three available system sample points: the furnace exit, the particulate control device inlet, and the particulate control device outlet. After passing through sample conditioners to remove moisture, the flue gas was typically analyzed for $O_2$, CO, $CO_2$, $SO_2$, and $NO_x$. Each constituent was normally analyzed at both the furnace exit and the outlet of the particulate control device simultaneously, using two analyzers. The concentration values from all of the instruments were recorded continuously. In addition, data were manually recorded at set time intervals. NO was determined using a pair of Rosemount Analytical NO chemiluminescent analyzers. $SO_2$ was measured using a pair of Ametek Instruments photometric gas analyzers. The remaining gases were measured by a pair of Rosemount Analytical multi-gas continuous emissions monitors. Each of these analyzers was regularly calibrated and maintained to provide accurate flue gas concentration measurements.

The baghouse vessel was a 20 inch (50.8 cm) (ID) chamber that is heat-traced and insulated, with the flue gas introduced near the bottom. The combustor produced about 200 ACFM (actual cubic feet per minute; about 5.7 actual m³/min) of flue gas at 300° F. (about 150° C.), therefore three 13-ft by 5-inch (3.96 m by 12.7 cm) bags provided an air-to-cloth ratio of 4 ft/min (1.22 m/min). Each bag was cleaned separately in operation with its own diaphragm pulse valve. In order to quantify differences in pressure drop for different test conditions, the bags were cleaned on a time basis, rather than with the cleaning cycle initiated by pressure drop. Once bag cleaning was initiated, all three bags were pulsed in rapid succession on-line.

Tests were also conducted with a single-wire, tubular ESP replacing the fabric filter. The ESP unit was designed to provide a specific collection area of 125 at 300° F. (150° C.). Since the flue gas flow rate for the PTC is 130 SCFM (standard cubic feet per minute; about 3.7 NCMM (normal m³/min)), the gas velocity through the ESP is 5 ft/min (about 1.52 m/min). The plate spacing for the ESP unit is 11 in (27.9 cm). The ESP was designed to facilitate thorough cleaning between tests so that all tests can begin on the same basis.

PTC Results

Figure 6:
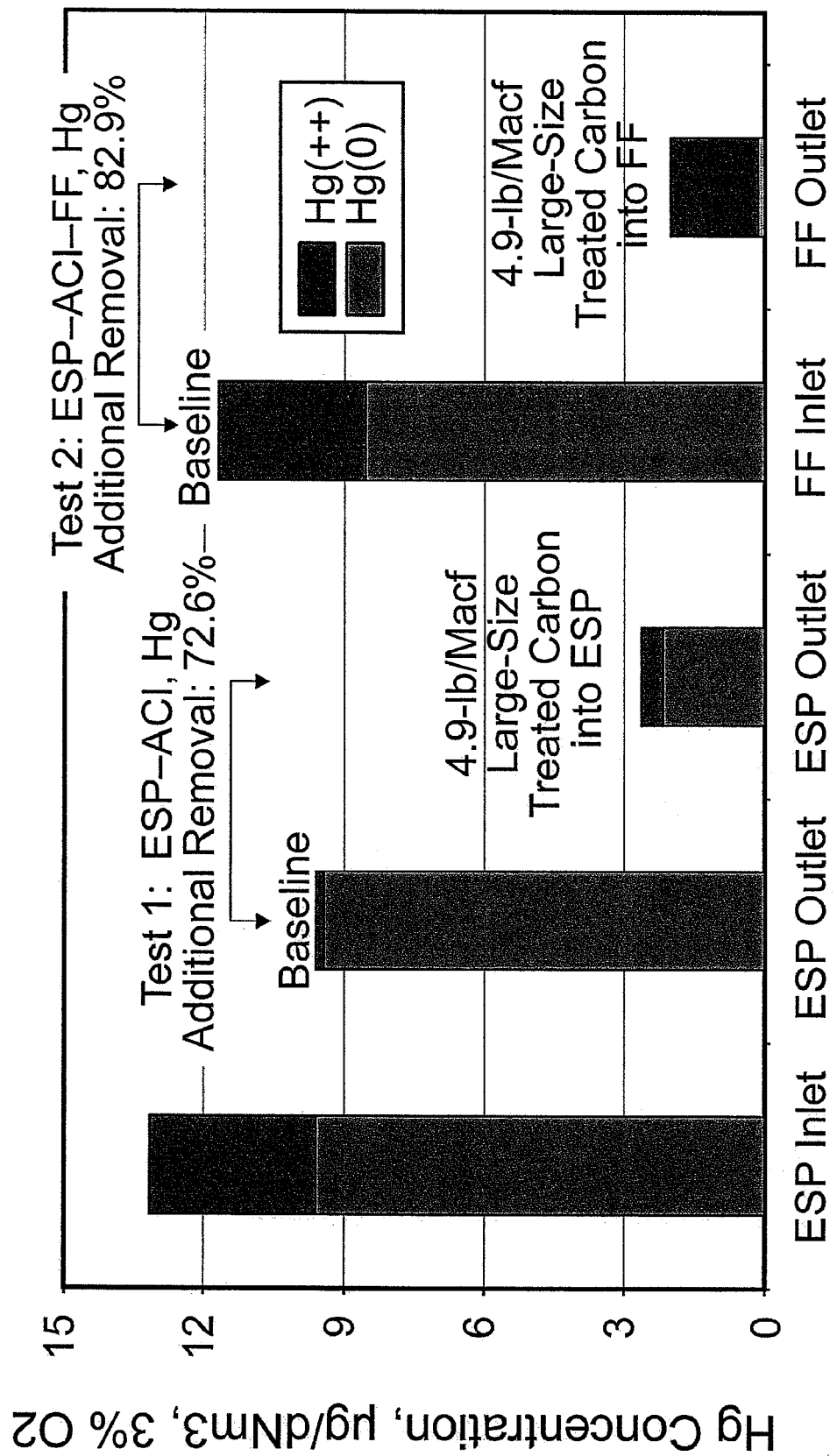
FIG. 6 is a bar chart illustrating pilot-scale mercury removal results, including large-size sorbent results.

Results are illustrated in FIG. 6. As can be observed in FIG. 6, even though the tested sorbent particle size is significantly larger than normal sorbent particles, the treated larger-than-normal sized (that is, >60 micrometers) activated carbon sorbent was quite effective at capturing mercury. Approximately 75% of the mercury was captured when the larger-sized treated AC was injected ahead of the pilot-scale ESP, while approximately 85% of the mercury was captured when injected ahead of the pilot-scale fabric filter ("FF"). Note that in FIG. 6 (and throughout) "Macf" (and "MACF") indicates million actual cubic feet (1 MACF is about 0.028 million actual cubic meters or "MACM").

Figure 7:
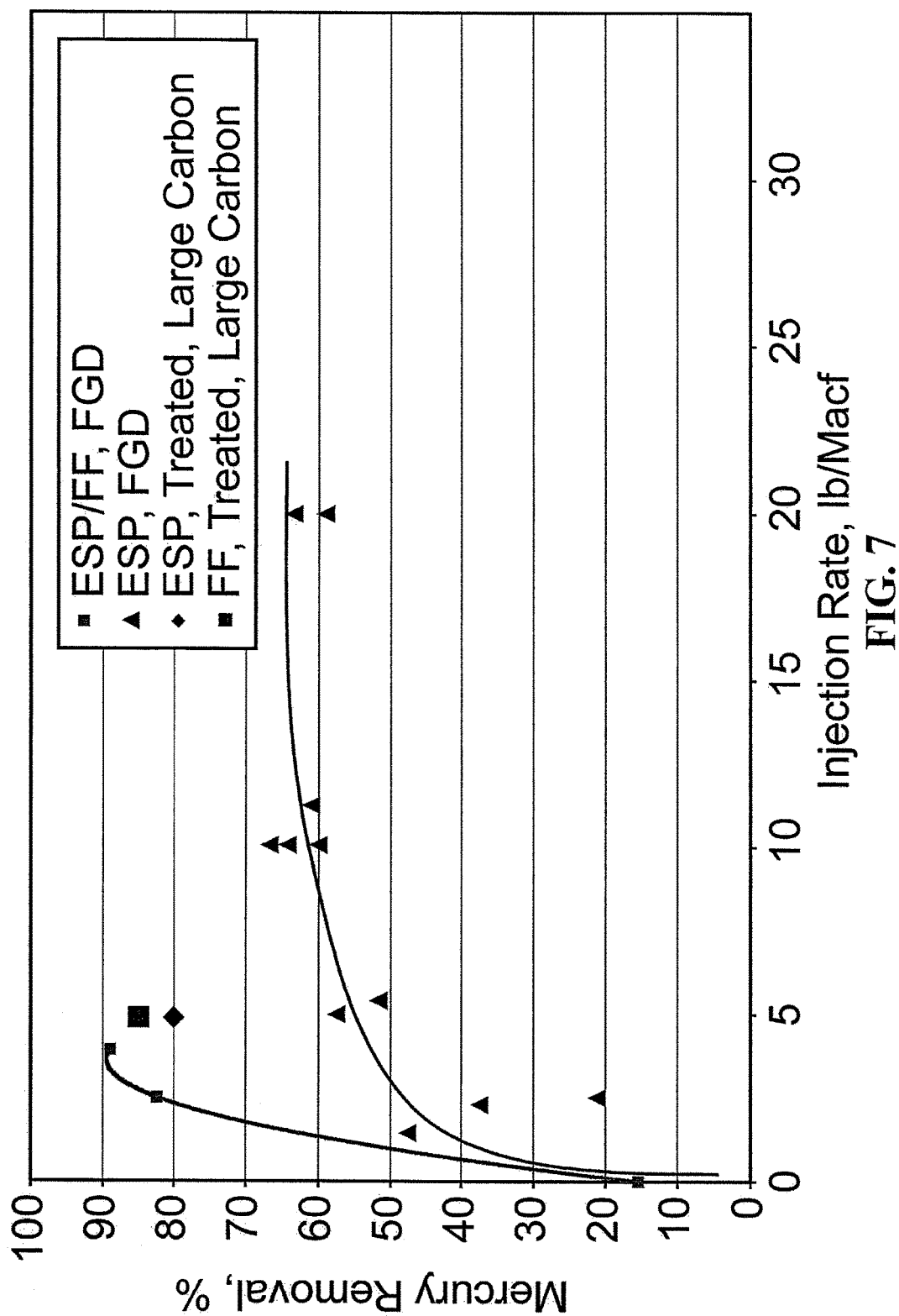
FIG. 7 is a diagram illustrating the effects of sorbent size and injection rate on mercury removal for ESPs and fabric filters.

Referring now to FIG. 7, it can be observed that the larger-sized treated AC when injected ahead of the pilot-scale ESP (diamond symbol(s)) performed better than the finer standard AC (triangles) under the same arrangement. In comparison, when injected ahead of the fabric filter (FF), the larger-sized treated AC (square) performed similarly to slightly worse. However, for this application, the larger-sized treated AC can be physically separated from the smaller flyash particles, and the sorbent can then be regenerated, recycled, and reused. This will substantially improve overall utilization and economics. These data thus show that a larger-than-normal sized sorbent can provide effective mercury control and ease flyash and AC separation, thereby also preserving the characteristics of the flyash for sale and beneficial use. Accordingly, because >60 μm sorbent particles have been successfully demonstrated, superior mercury control can be obtained with >40 μm particles, which may be preferred in some applications, depending on the sorbent particle/ash separation system used. Note that in FIG. 7 (and throughout) "Macf" (and "MACF") indicates million actual cubic feet.

Example 7

Liquid Phase (Organic Solvent) Halogenation

A 5% solution of bromine in ligroin was prepared by carefully adding 50 g of bromine to 1 liter of cold ligroin. One kg of activated carbon was added to the bromine solution in a large metal can. The slurry was stirred with a large paddle during the addition and for a short time afterwards until all the bromine had reacted with the carbon as indicated by the disappearance of the red color. The slurry was filtered using a Buchner funnel under vacuum. The carbon cake that was collected on the filter was dried in an oven at 110° C. for several hours until it appeared dry and a constant weight was obtained. As in Example 1, some moisture was left in the carbon, however. The dried carbon was then tumbled in the rotating barrel with metal pieces to break up and fluff the carbon.

Example 8

Promoted Activated Carbon Sorbents

A bench-scale procedure based on the above description was used to test the initial activities and capacities of several promoted activated carbon sorbents using powdered carbon, including the bromine-containing activated carbons prepared from a commercially available sorbent and an aerogel carbon film sorbent, as well as the original precursor carbons for comparison. Bromine-treated carbons were prepared by impregnation of the powdered activated carbon precursors in a stirred solution of bromine in carbon tetrachloride or methylene chloride, or alternatively, in an aqueous solution of HBr, followed by drying in air at ambient temperature and drying in an oven at 100° C. in air or nitrogen. Bromine-treated carbons were also prepared by impregnating bromine from the gas phase by passing the gas through a rotating dry bed of the activated carbon precursor. The results indicated that adding a second component to the solution improved the capacity of the sorbent.

The carbons were initially tested in a heated bed, where a synthetic flue gas stream containing elemental mercury (11 μg/m$^3$) was passed through the bed. Concentrations of total and elemental Hg in the effluent gas were determined using a Sir Galahad mercury CEM ("continuous emission monitor") (mfr. P S Analytical, Deerfield Beach, Fla., USA). The powdered sorbent was supported on a quartz filter during the test, and the other sorbents were tested as a triple layer. A comparison of the original commercial-grade powdered carbon sorbent with the sorbent after it was treated with 0.1 N HBr, and the powder was collected by centrifugation and drying, revealed that the mercury capture activity increased from an initial capture efficiency of about 50% of the Hg in the inlet to 100% capture. A comparison of the sorbent after subsequent regeneration with HBr indicated that it not only captured mercury at the same level as before (100% capture) but its capacity was prolonged by several minutes, and thus enhanced. Similar results were obtained with the carbon film and carbon fiber sorbents by treatment with molecular bromine in solution or in dry beds as described above.

Example 9

Fluidized/Ebulliated Bed Preparation

An activated carbon sorbent was prepared by treating the carbon by impregnating molecular bromine from a gas composition containing molecular bromine by flowing the gas through a liquid bromine reservoir in series with a fluidized bed or ebulliated bed of the carbon. The amount of bromine taken up by the carbon ranges (in one example) from <1 to about 30 g per 100 g of activated carbon, depending on the proportions used.

Example 10

Full-Scale Testing

In this example, a baghouse (fabric filter) or ESP was used to collect particulates in the exhaust of a full-scale commercial pulverized coal-burning facility. A scrubber and sorbent bed were also used to remove undesired constituents from the flue gas stream, before being fed to the stack. In this example, the halogen/halide promoted carbon sorbent was injected into the flue gas after the boiler. In general however, the inventive sorbent can be injected where desired (e.g., before, after, or within the boiler).

In one exemplary test conducted at a facility fired with lignite coal, the flue gas phase mercury (elemental) concentration was between 10 and 11 μg/m$^3$. The ash and injected carbon were collected in the baghouse at 350° F. to 375° F. (about 175-190° C.). Injection of commercial-grade activated carbon powder (untreated) at a rate of 1.0 lb/MACF ("MACF" and "Macf" represent one million actual cubic feet; 1.0 lb/MACF is about 16 kg/MACM (million actual cubic meters)) resulted in mercury effluent concentrations of 3.8-4.2 μg/m$^3$ (representing 62%-58% removal of the mercury from the gas, respectively), and at 2.0 lb/MACF (about 32 kg/MACM), gave 74%-71% removal. Injection of the bromine-treated carbon at 1.0 lb/MACF resulted in 73%-69% removal and at 2.0 lb/MACF gave 86%-84% removal. Thus, a significant increase in the mercury capture was exhibited during use of the bromine promoted carbon sorbent of the present invention.

Example 11A

Addition of Optional Alkaline
Component—Bench-Scale

The efficiency of the activated carbons for mercury capture can be improved considerably by employing a basic material co-injected with the activated carbon, in order to capture any oxidized mercury that may be released from the sorbent, or to capture some of the sulfur or selenium oxides in the flue gas that can have a detrimental effect on the sorbent capacity.

Figure 8:
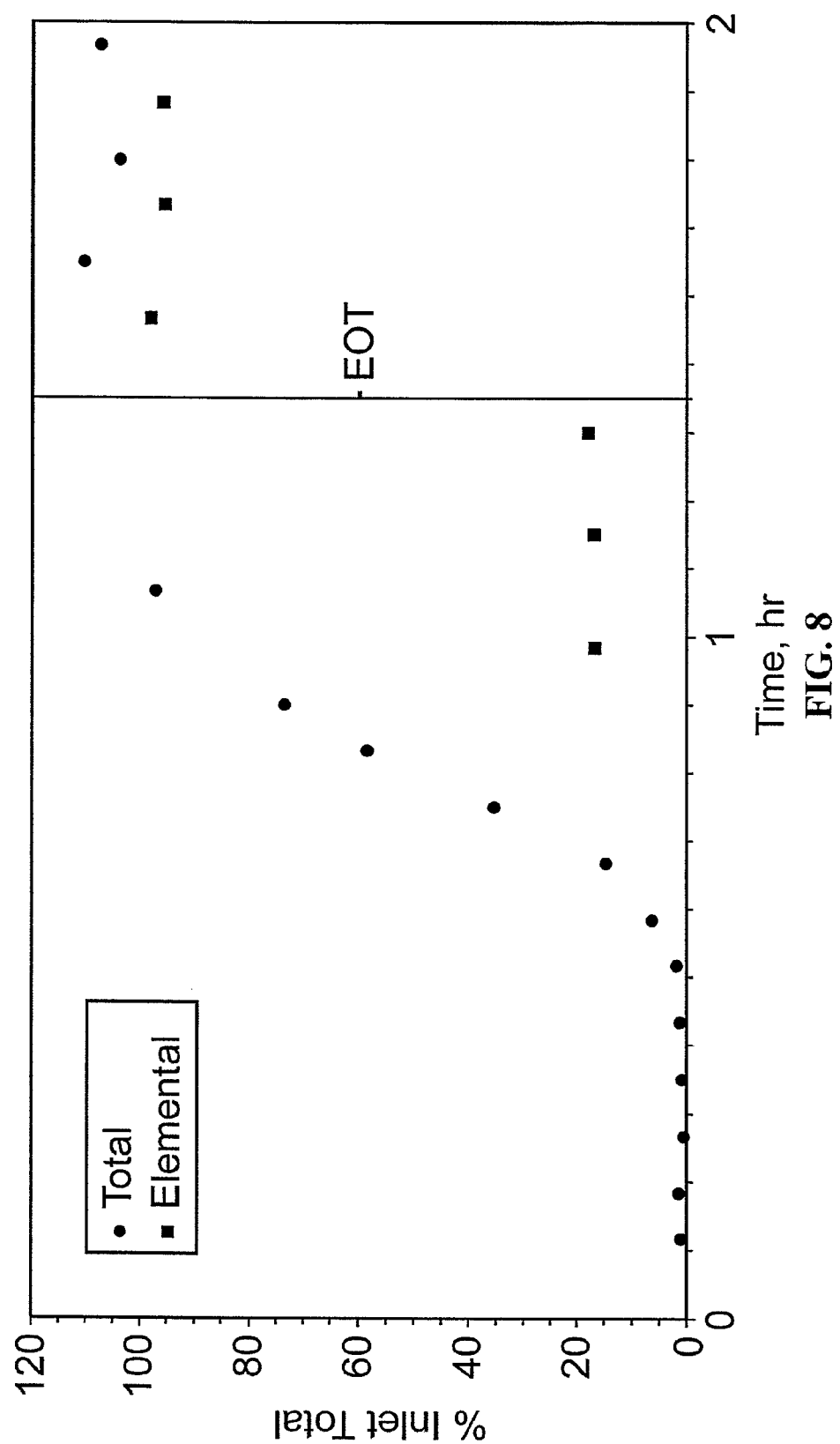
FIG. 8 is a diagram illustrating the breakthrough curves for a brominated NORIT Darco FGD sorbent with inert sand.
Figure 9:
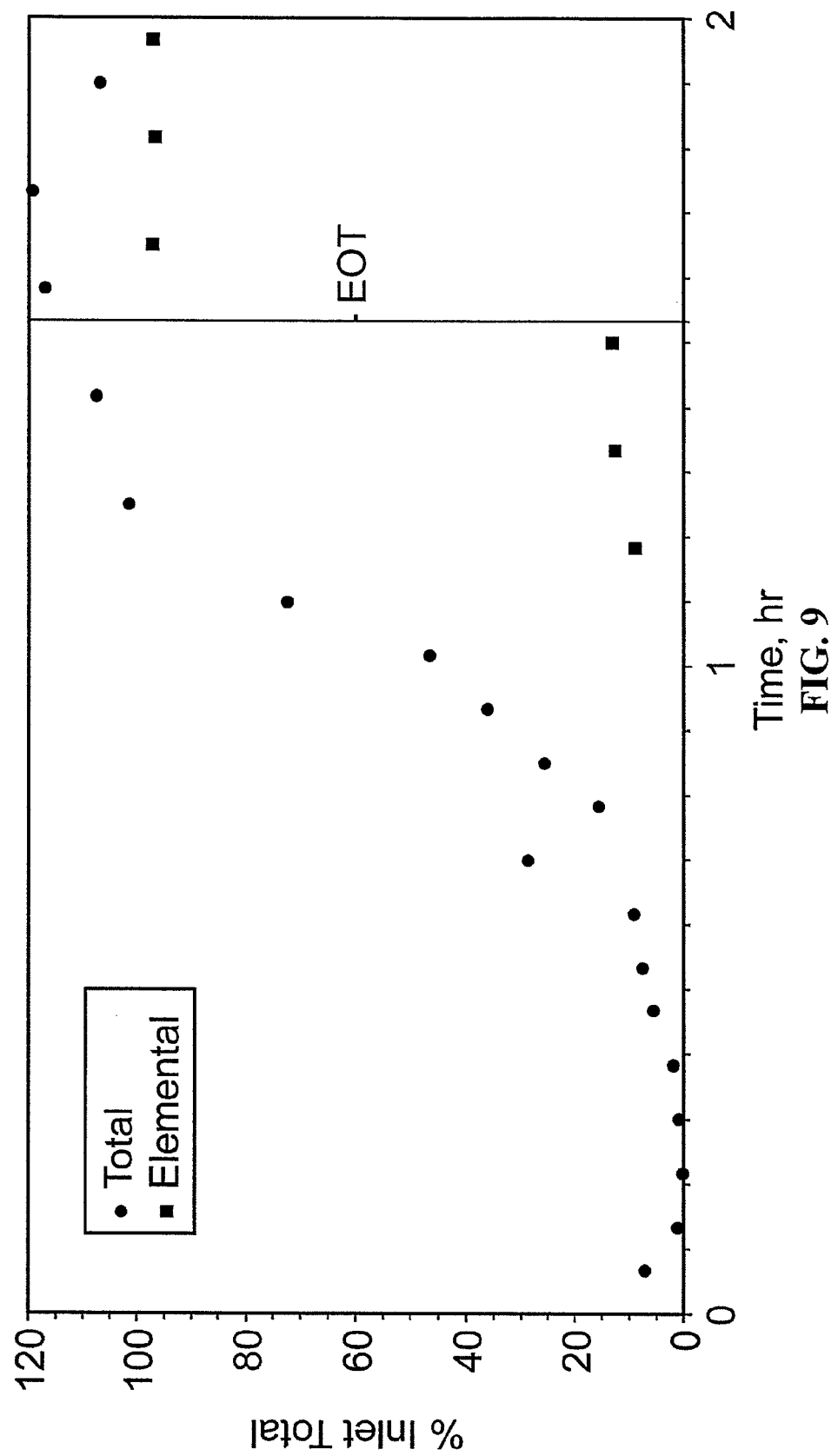
FIG. 9 is a diagram illustrating the breakthrough curves for brominated NORIT Darco FGD sorbent with a co-injected alkali material.

Bench-scale testing was conducted by preparing a filter composed of 37 mg of brominated activated carbon mixed with 113 mg of calcium oxide. The test was conducted as described in Example 1 and compared with the same carbon sorbent but with an inert diluent. The breakthrough curve for the mixture of brominated (2%) NORIT Darco FGD sorbent with inert sand is shown in FIG. 8, and the breakthrough curve for the mixture with CaO is shown in FIG. 9. It can be seen that the point of 50% breakthrough improves to 65 minutes with the mixture with CaO from only 48 min with the sand mixture.

Example 11B

Addition of Optional Alkaline Component—Pilot-Scale

Figure 10:
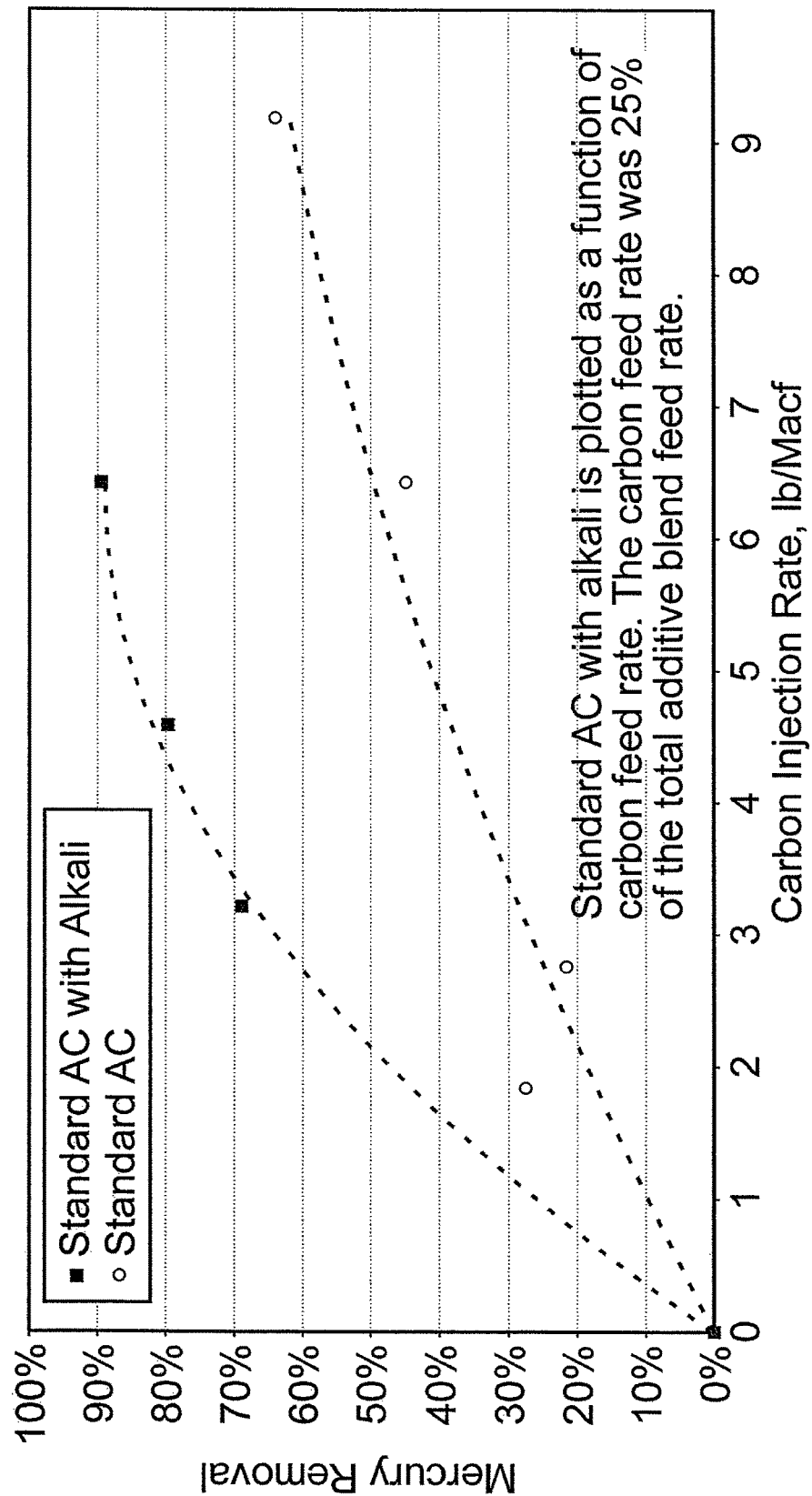
FIG. 10 is a plot of mercury removal vs. carbon injection rate with and without co-injection of alkali material.

Tests were conducted on the pilot-scale PTC combustor described above with reference to Example 6 while firing a Texas lignite to evaluate mercury control by co-injecting a standard activated carbon (also referred to herein as "AC") and an alkali material upstream of a fabric filter. Typical results are illustrated in FIG. 10. As shown in FIG. 10, co-injecting lime with activated carbon vastly improved mercury removal. Mercury removals of approximately 90% were achieved with the co-injected sorbents, whereas less than 60% removal was achieved with the use of standard AC alone, even at much higher injection rates. Data from similar tests show that injecting similar quantities of sodium carbonate and AC, and lime and AC, resulted in mercury removals of approximately 80%, and 87%, respectively. These data suggest that other alkali can also be co-injected with AC to improve mercury removal. Other data show that flue gas temperature may impact the effectiveness of the alkali addition. Further test data indicate that flue gas contaminants, flue gas constituents ($SO_2$, $NO_x$, HCl, etc.), operating temperature, mercury form, and mercury concentration may impact the effectiveness of the alkali addition. This indicates that it may be desirable to be able to adjust and tailor, onsite, the alkali-to-AC ratio in order to optimize removal for a given set of site conditions.

Without wishing to be bound by any particular theory, the synergy observed in the improved performance when co-injecting the two materials can be explained as follows. First, tests indicate that binding sites on AC can be consumed by sulfur species and other contaminants. The alkali material interacts and reacts with these species thus minimizing their consumption of AC mercury binding sites. Second, other work has shown that standard AC will continue to oxidize mercury even though the binding sites are fully consumed. This oxidized mercury can then react with alkali material and subsequently be captured by the particulate control device. Thus, combining alkali with treated and/or non-treated AC synergistically takes advantage of these two mechanisms, resulting in improved mercury capture at reduced costs.

Example 12

Brominated Carbon Sorbent for Gasification Fuel Gas

Preparation of 5% Br2W-AC

Using a procedure similar to Example 3, a 2.5 wt/vol % solution of bromine in water was prepared. Granular Calgon F400 was added to the bromine solution to give a 5 wt/wt % brominated carbon product. The bromine solution was stirred with a large paddle during and after the addition until the red color in the water disappeared. The suspension was filtered by vacuum on a large Buchner funnel. The filter cake was dried in air, and then in an oven at 110° C. until a stable weight was obtained The moisture was reduced to 15%.

Preparation of 5% Br2D-AC

A brominated sorbent was prepared from $Br_2$ addition in solvent as described in Example 7, except that dichloromethane was used as the solvent instead of ligroin, and granular Calgon F400 was used.

Preparation of 5% PBr3-AC

A phosphohalogenated sorbent was prepared from $PBr_3$ using the method described in Example 5, except granular Calgon F400 was used.

Testing in Hydrogen Atmosphere-Procedure

To simulate the capture of mercury from a heated fuel gas or syngas from coal gasification, tests were conducted employing a stream comprising 10% vol/vol hydrogen in nitrogen passing through the sorbent at 500 cc/min. The stream contained 26.9 micrograms/$m^3$ of elemental mercury from a commercial mercury permeation source.

In the tests, the sorbent (0.5 g) was placed in a 0.39 inch (1 cm, inside diameter) glass tube fitted with a medium frit sintered glass filter disc to hold the sorbent in the gas stream. The tube containing the sorbent bed was connected to a gas inlet tube for introducing the gas stream containing the mercury vapor and at the outlet to a tube connection to the detector. The detector was a Semtech 2000 continuous mercury emission monitor. The tube was equilibrated in a nitrogen flow (450 cc/min) for 5 minutes at ambient temperature to stabilize the system. The detector showed 0 concentration of mercury in the effluent from the sorbent bed. (The blank run with no sorbent read 26.9 micrograms/$m^3$). The tube was then placed in an oven at the selected temperature for the test (from 250° to 400° C.). Effluent mercury concentration data from the detector were collected until the detector showed a constant reading for 5 minutes. Hydrogen (50 cc/min) was then added to the gas stream and detector readings were taken every 5 min. Tests were conducted at several oven temperatures for various periods of time up to 3 hours, depending on the temperature and sorbent. The elemental mercury concentration data were plotted as a percent of inlet mercury concentration versus time as in Example 1. All the mercury in the effluent was elemental, so a single detector was sufficient, and no $SnCl_2$ trap was needed to convert to elemental mercury (as in Example 1). The time for 50% breakthrough (time to reach 50% capture) was then determined from the breakthrough curves.

Results

The results are shown in Table 1 (below) for the unbrominated sorbent (Calgon F-400), the brominated sorbents (5% Br2W-AC and 5% BrD-AC), and the phosphobrominated sorbent (5% PBr3-AC). The maximum mercury concentration obtained in the effluent in each run is also reported in Table 1 for the time period indicated in the last column.

Under the reducing hydrogen conditions, the unbrominated sorbent broke through immediately and was exhausted after only 6.5 min. This complete failure occurred because the hydrogen reduces the captured mercury in the unbrominated sorbent at any temperature above 100° C. Both of the brominated sorbents exhibited excellent reactivity and good capacity at all temperatures, up to at least 400° C. The phosphobrominated sorbent exhibited superior reactivity and capacity at all temperatures, up to at least 400° C.

TABLE 1

Times for 50% Breakthrough
Maximum Observed Hg Concentrations for Sorbents
(10% Hydrogen Streams)

| Sorbent | Temp (° C.) | 50% breakthrough (min) | Maximum [Hg] (μg/m³) | Time (min) |
|---|---|---|---|---|
| F-400 | 250 | 6 | 20.3 | 6.5 |
| 5% Br2W-AC | 250 | >150 | 1.4 | 150 |
| 5% Br2W-AC | 300 | >180 | 4.3 | 180 |
| 5% Br2W-AC | 350 | 160 | 15.1 | 180 |
| 5% Br2W-AC | 400 | 60 | 13.9 | 65 |
| 5% PBr3-AC | 250 | >140 | 0.4 | 140 |
| 5% PBr3-AC | 300 | >150 | 0.5 | 150 |
| 5% PBr3-AC | 350 | >150 | 1.4 | 150 |
| 5% Br2D-AC | 350 | >180 | 2.1 | 180 |
| 5% Br2D-AC | 400 | >180 | 10.9 | 180 |

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The examples provided in the disclosure are presented for illustration and explanation purposes only and are not intended to limit the claims or embodiment of this invention. While the preferred embodiments of the invention have been shown and described, modifications thereof can be made by one skilled in the art without departing from the spirit and teachings of the invention. Process criteria, equipment, and the like for any given implementation of the invention will be readily ascertainable to one of skill in the art based upon the disclosure herein. The embodiments described herein are exemplary only, and are not intended to be limiting. Many variations and modifications of the invention disclosed herein are possible and are within the scope of the invention. Use of the term "optionally" with respect to any element of the invention is intended to mean that the subject element is required, or alternatively, is not required. Both alternatives are intended to be within the scope of the invention.

The discussion of a reference in the Background is not an admission that it is prior art to the present invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

Although the invention is described herein as a sorbent material and associated processes for its preparation and use, it is nevertheless not intended to be limited to the details described, since various modifications and structural changes may be made therein without departing from the spirit of the invention and within the scope and range of equivalents of the claims.

We claim:

1. A halocarbon sorbent formed by an addition reaction between a base activated carbon and a promoter selected from the group consisting of $Cl_2$, $Br_2$, HCl, HBr, $PBr_3$, and combinations thereof, wherein
    the halocarbon sorbent has a mean particle size greater than 60 microns, and
    the halocarbon sorbent exposed to a gas stream comprising elemental mercury at a temperature of about 250° C. has a 50% breakthrough time of the elemental mercury that is greater than or equal to about 2500% of the breakthrough time of the elemental mercury of a corresponding halocarbon sorbent that is free of the promoter and tested under the same conditions.

2. The halocarbon sorbent according to claim 1 wherein the promoter is selected from the group consisting of $Br_2$, HBr, and combinations thereof.

3. The halocarbon sorbent according to claim 1 wherein the base activated carbon is selected from the group consisting of powdered activated carbon, granular activated carbon, carbon black, carbon fiber, aerogel carbon, pyrolysis char, activated carbon with an average particle size greater than 60 micrometers, and combinations thereof.

4. The halocarbon sorbent according to claim 1 further comprising an alkaline component selected from the group consisting of alkali elements, alkaline earth elements, alkali salts, alkaline earth salts, and combinations thereof.

5. The halocarbon sorbent according to claim 1 further comprising a mercury-stabilizing reagent selected from the group consisting of S, Se, $H_2S$, $SO_2$, $H_2Se$, $SeO_2$, $CS_2$, $P_2S_5$, and combinations thereof.

6. The halocarbon sorbent according to claim 5 further comprising an alkaline or alkaline earth element.

7. The halocarbon sorbent of claim 2 further comprising a component that is selected from the group consisting of halogens, hydrogen halides, Group V halides, Group VI halides, and combinations thereof.

8. The halocarbon sorbent according to claim 7 wherein the concentration of the component in the halocarbon sorbent is present in about 1 wt-% to about 15 wt-% of the concentration of the promoter incorporated into the sorbent.

9. The halocarbon sorbent according to claim 8 wherein the component is selected from the group consisting of halogens, HI, HBr, HCl, and combinations thereof.

10. The halocarbon sorbent according to claim 9 wherein the component is selected from the group consisting of $I_2$, HI, and combinations thereof.

11. The halocarbon sorbent according to claim 1 wherein the promoter is substantially in vapor form in its addition reaction with the base activated carbon.

12. The halocarbon sorbent according to claim 11 wherein the promoter is combined with an organic solvent prior to reaction with the base activated carbon.

13. The halocarbon sorbent of claim 11 wherein the promoter and the component are combined with the base activated carbon substantially simultaneously.

14. The halocarbon sorbent according to claim 1 wherein the promoter is $Br_2$ and the sorbent comprises a component that is HI.

15. A method for separating mercury in a gas stream comprising:
    contacting carbon including at least some graphene and a promoter selected from the group consisting of an elemental halogen, a group V halide, a group VI halide, a hydrohalide, and combinations thereof to form a promoted sorbent particulate that is the halocarbon sorbent of claim 1, comprising forming carbocations using the promoter on at least some edge structures of at least some of the graphene; and
    contacting at least some of the mercury in the stream and the promoted sorbent particulate to form a stabilized mercury-promoted sorbent particulate, wherein the carbocations on the edge structures of the graphene accept at least some electrons from mercury atoms of the mercury.

16. The method of claim 15, wherein the promoter is an elemental halogen or a hydrohalide, or a combination thereof.

17. The method of claim 16, wherein the elemental halogen is bromine, or wherein the hydrohalide is hydrogen bromide, or both.

18. The method of claim 15, wherein the promoter is $PBr_3$ or $SCl_2$.

19. The method of claim 15, further comprising:
contacting the promoted sorbent particulate, the mercury-containing gas stream, or both, with an alkaline material.

20. The method of claim 15, wherein the promoter is in one of gaseous form or an organic solvent.

21. The method of claim 20, wherein the organic solvent is a hydrocarbon, a chlorinated hydrocarbon, or a supercritical carbon dioxide.

22. A method for separating mercury in a gas stream comprising:
contacting carbon including at least some graphene having at least some edges thereon and a promoter including at least one of bromine, bromine compounds, and combinations thereof to form a promoted sorbent particulate that is the halocarbon sorbent of claim 1 by modifying at least some edges of at least some of the graphene; and
contacting at least some of the mercury in the stream and the promoted sorbent particulate to form a stabilized mercury-promoted sorbent particulate, wherein the modified edges of the graphene form carbocations that accept at least some electrons from mercury atoms of the mercury.

23. The method of claim 22, wherein the promoter is an elemental bromine, hydrogen bromide, or both.

24. The method of claim 23, wherein the promoter is $PBr_3$ or $SBr_2$.

25. The method of claim 22, further comprising:
contacting the promoted sorbent particulate, the mercury-containing gas stream, or both, with an alkaline material.

26. The method of claim 22, wherein the promoter is in one of gaseous form or an organic solvent.

27. The method of claim 26, wherein the organic solvent is a hydrocarbon, a chlorinated hydrocarbon, or a supercritical carbon dioxide.

28. A method for separating mercury in a gas stream comprising:
contacting carbon including at least some graphene having at least some edges and a promoter selected from the group consisting of an elemental halogen, a group V halide, a group VI halide, a hydrohalide, and combinations thereof to form a promoted sorbent particulate that is the halocarbon sorbent of claim 1 having at least some modified some edge structures of at least some of the graphene; and
contacting at least some of the mercury in the stream and the promoted sorbent particulate to form a stabilized mercury-promoted sorbent particulate, wherein the modified edge structures of the graphene form carbocations that accept at least some electrons from mercury atoms of the mercury.

29. The method of claim 28, wherein the promoter is an elemental halogen or a hydrohalide, or a combination thereof.

30. The method of claim 29, wherein the elemental halogen is bromine, or wherein the hydrohalide is hydrogen bromide, or both.

31. The method of claim 28, further comprising:
contacting the promoted sorbent particulate, the mercury-containing gas stream, or both, with an alkaline material.

32. The method of claim 28, wherein the promoter is in one of gaseous form or an organic solvent.

33. The method of claim 28, wherein the organic solvent is a hydrocarbon, a chlorinated hydrocarbon, or a supercritical carbon dioxide.

* * * * *